(12) United States Patent
Das et al.

(10) Patent No.: US 6,970,855 B2
(45) Date of Patent: Nov. 29, 2005

(54) METHOD AND SYSTEM FOR ENTERPRISE-LEVEL UNASSISTED CUSTOMER SHIPPING

(75) Inventors: Pradeep Das, Bethel, CT (US); Michael Calderwood, Cross River, NY (US); Emily C. Debolt, Cheshire, CT (US); Timothy L. Gesse, La Porte, IN (US); Bernard E. Gracey, Jr., Southbury, CT (US); Ralph E. Martin, Jr., Kearney, MO (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/248,221

(22) Filed: Dec. 30, 2002

(65) Prior Publication Data

US 2003/0144971 A1 Jul. 31, 2003

Related U.S. Application Data

(60) Provisional application No. 60/319,104, filed on Jan. 29, 2002.

(51) Int. Cl.[7] ............................................. G06F 17/60
(52) U.S. Cl. ..................... 705/407; 705/16; 705/408
(58) Field of Search ........................... 705/16, 23, 401, 705/407, 408, 410

(56) References Cited

U.S. PATENT DOCUMENTS

| | | | |
|---|---|---|---|
| 2,812,904 A | 11/1957 | Kolisch | |
| 3,290,491 A | 12/1966 | Wahlberg | |
| 4,796,193 A * | 1/1989 | Pitchenik | 705/408 |
| 4,825,053 A | 4/1989 | Caille | 235/380 |
| 4,836,352 A | 6/1989 | Tateno et al. | 194/215 |
| 5,233,532 A * | 8/1993 | Ramsden | 705/407 |
| 5,340,948 A * | 8/1994 | Ramsden | 177/25.15 |
| 5,369,221 A * | 11/1994 | Ramsden | 177/25.15 |
| 5,375,172 A * | 12/1994 | Chrosny | 380/51 |
| 5,413,276 A | 5/1995 | Sheffer | 229/120.11 |
| 5,481,464 A * | 1/1996 | Ramsden | 705/407 |
| 5,586,037 A | 12/1996 | Gill et al. | 364/464.03 |
| 5,656,799 A | 8/1997 | Ramsden | 177/2 |
| 5,659,799 A * | 8/1997 | Ramsden et al | 177/2 |
| 5,737,729 A | 4/1998 | Denman | 705/401 |
| 5,831,220 A * | 11/1998 | Ramsden et al | 177/1 |
| 6,101,487 A * | 8/2000 | Yeung | 705/410 |
| 6,105,014 A * | 8/2000 | Ramsden et al | 705/410 |
| 6,134,561 A | 10/2000 | Brandien | 707/104 |
| 6,233,568 B1 | 5/2001 | Kara | 705/410 |

(Continued)

FOREIGN PATENT DOCUMENTS

GB 2271452 A * 4/1994

(Continued)

OTHER PUBLICATIONS

Canlen: "Shipping services drive store traffic: hardware stores off UPS, postal service. (Brief Article)"; Home Channel News, Sep. 16, 2002, vol. 28, No. 17, p. 3.*

Primary Examiner—Edward Cosimano
(74) Attorney, Agent, or Firm—George M. Macdonald; Angelo N. Chaclas

(57) ABSTRACT

A system and method for unassisted enterprise-level unassisted customer shipping is described providing for payment of shipping and item costs in a single transaction. In one configuration, a customer utilizes a kiosk to process a shipping bill of materials for presentment at a point of sale terminal.

10 Claims, 18 Drawing Sheets

U.S. PATENT DOCUMENTS 6,298,337 B1 * 10/2001 Kubatzki et al ............ 705/410
2002/0116318 A1 * 8/2002 Thomas et al ................ 705/37
2002/0156701 A1 * 10/2002 Fultz ........................... 705/27

FOREIGN PATENT DOCUMENTS

WO    WO 95/30132 A1 * 11/1995

* cited by examiner

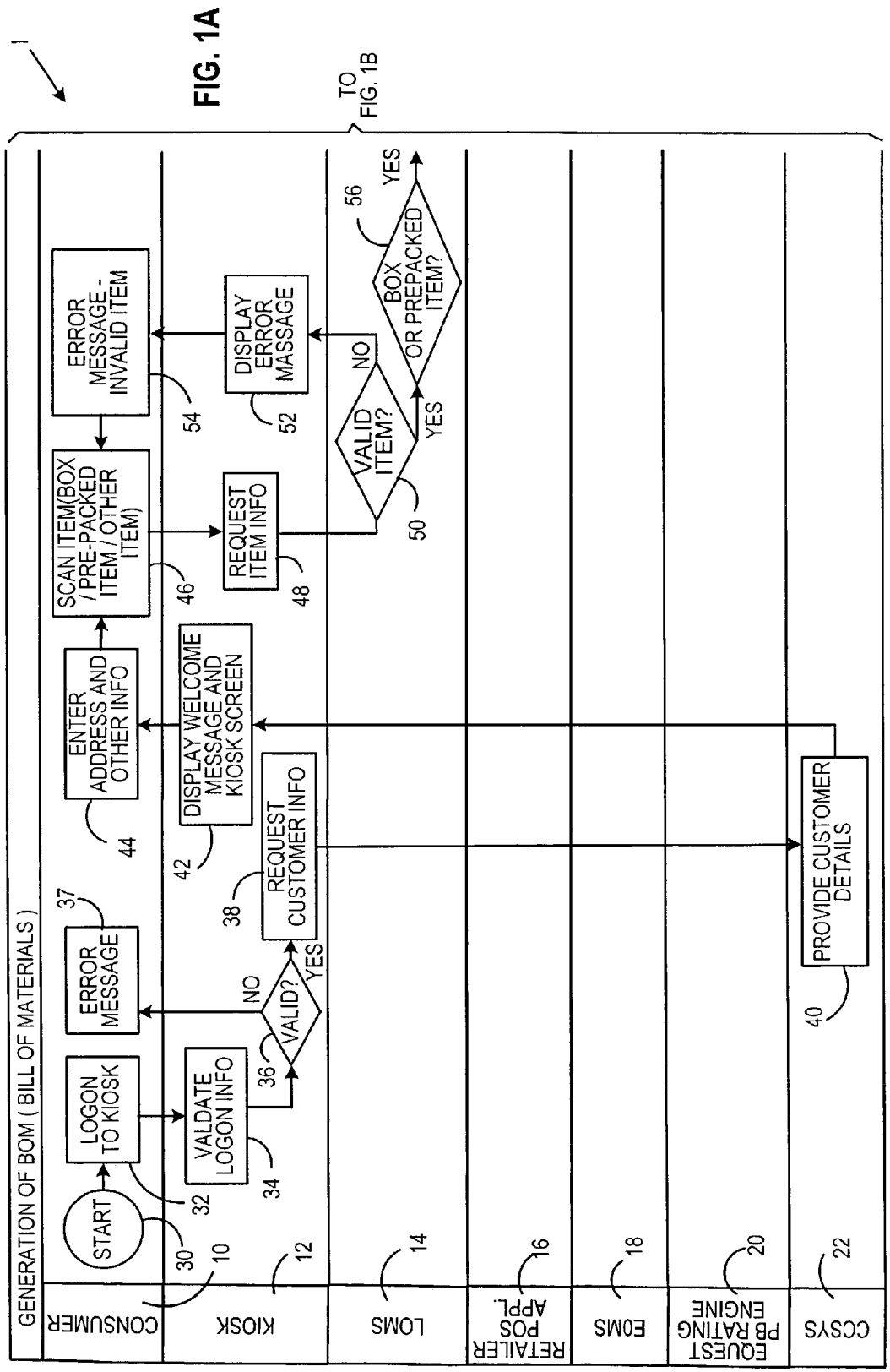

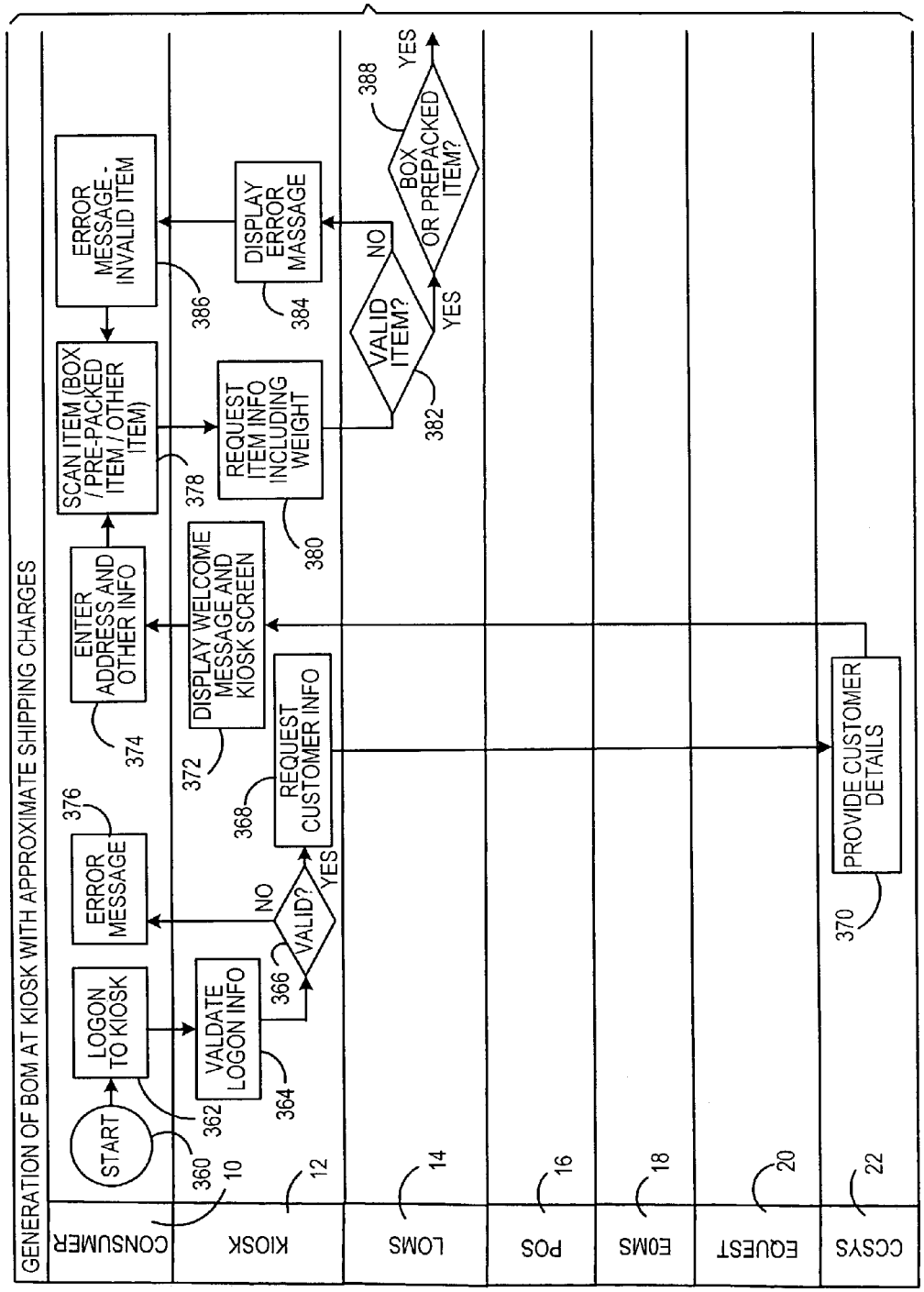

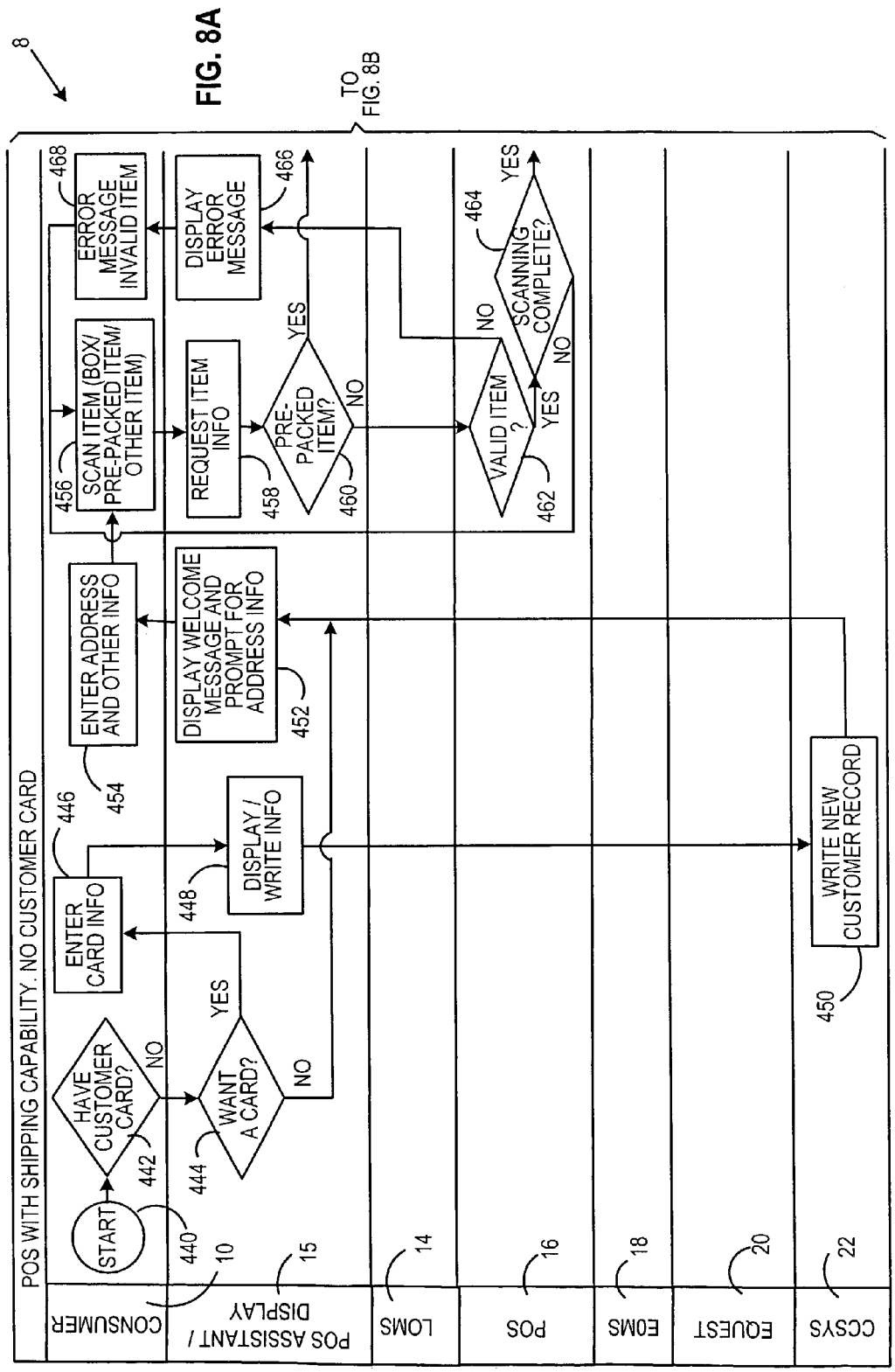

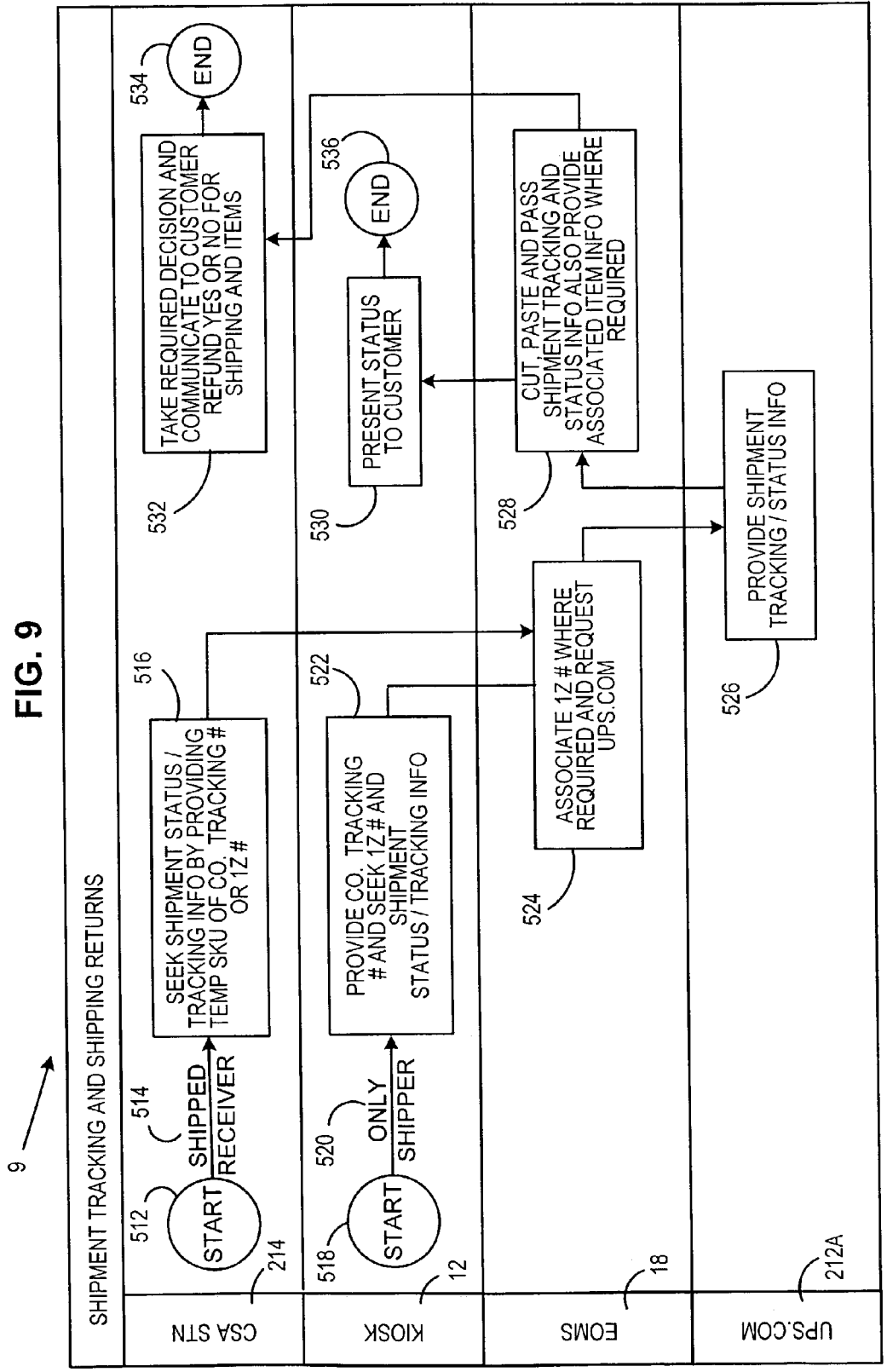

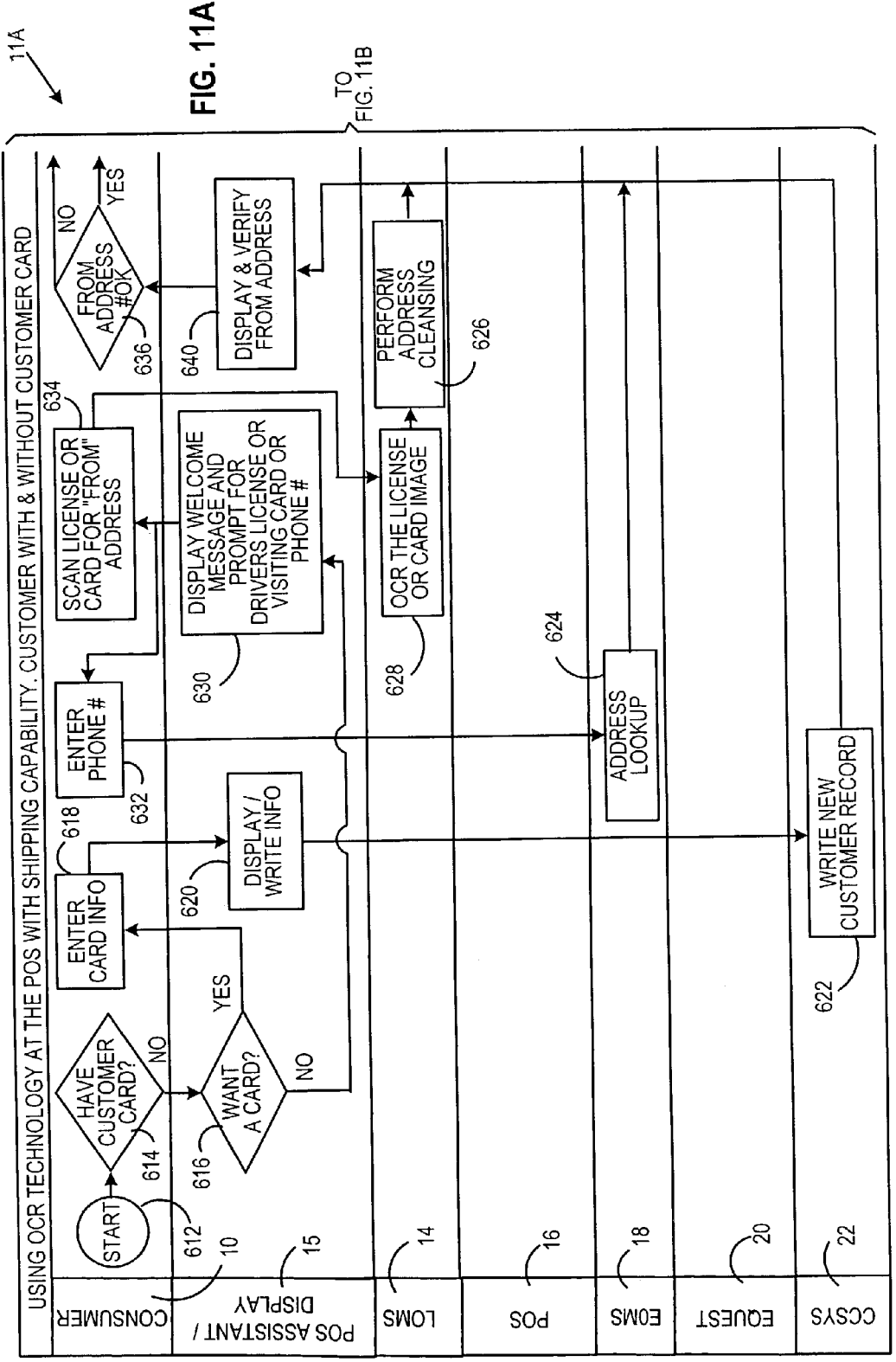

METHOD AND SYSTEM FOR ENTERPRISE-LEVEL UNASSISTED CUSTOMER SHIPPING

CROSS REFERENCE TO RELATED APPLICATIONS

This application claims priority under 35 U.S.C. section 119(e) from Provisional Patent Application Ser. No. 60/319,104, filed Jan. 29, 2002, entitled Method And System For Enterprise-Level Unassisted Customer Shipping, which is incorporated herein by reference in its entirety.

BACKGROUND OF INVENTION

The illustrative embodiments disclosed in the present application are useful in systems including those for arranging for shipping services.

In a typical retail environment, a shopper who wants to purchase one or more gift items in a store for a geographically distant relative or friend has to go to a second outlet to ship those items. For example, the shopper may go to a United States Postal Service (USPS) post office, a United Parcel Service (UPS) shipping center, or other parcel-shipping center. In such a case the customer may not be able to compare shipping service and prices in order to choose from among several carriers.

A shipping service may be provided in another area in a store. In such cases, the shopper will undertake two separate payment transactions—one for the goods and one for the shipping charges. Retailers who desire to provide shipping as a service to their customers are not only concerned about carrier compliance but are also concerned about any potential danger or liability regarding shipping hazardous material out of the store.

Retailers are also concerned from a loss prevention perspective if an in-store shipping service could provide an opportunity for theft. To address these issues, retailers either do not offer a shipping service or have to dedicate a resource at the customer service desk to provide the service.

SUMMARY OF INVENTION

The present application describes several illustrative embodiments related to shipping systems including those for allowing a customer to pre-determine shipping charges before the customer reaches a point of sale (POS) register. Certain embodiments are summarized here for illustrative purposes.

Certain embodiments describe a system for enhancing customer convenience by requiring only one register transaction to pay for both the items (those being shipped and the other items not being shipped) as well as the shipping charges. Certain embodiments provide enhanced integrity from a loss prevention standpoint in that the contents of the box are always under the control of the retailer. Still other illustrative embodiments described herein may reduce the labor investment of a retailer by allowing the customer to perform certain tasks.

In certain other embodiments, the retailer establishes a gift and convenience brand and may increase same store and same customer sales growth. In certain embodiments, the retailer leverages its carrier discounts to pass savings on to its customers while retaining part of the discount to maintain a healthy margin. In certain embodiments, the retailer drives traffic to the retailer Internet site by providing package tracking services on the site. In certain embodiments, the retailer captures data regarding in-store purchase and payment behavior and transfers that knowledge to their corporate or Internet systems.

This application describes certain embodiments for the integration of an enterprise package rating engine, a retail store Point of Sale (system), a database of un-shippable goods (legal, regulatory, loss prevention), a kiosk that controls the shipping item identification, verification, and rating process. It describes a post-register-transaction shipping label generation and application process, an enterprise-level archive for track, trace, and returns processing system, and integration with the Internet site of the retailer. It describes a system to facilitate an integrated in-store carrier package tracking solution to allow customers to conveniently ship items while requiring only one payment transaction.

BRIEF DESCRIPTION OF DRAWINGS

FIGS. 1A, 1B and 2 are a flow chart showing a process for generating a bill of materials according to an illustrative embodiment of the present application.

FIGS. 7A and 7B are a flow chart showing a process for generating a bill of materials at a kiosk according to another illustrative embodiment of the present application.

FIGS. 8A and 8B are a flow chart showing a process for a shipping transaction according to another illustrative embodiment of the present application.

FIG. 9 is a flow chart showing a process for shipment tracking and shipment returns according to another illustrative embodiment of the present application.

FIGS. 11A, 11B, and 11C are a flow chart showing a process for a shipping transaction using optical character recognition according to another illustrative embodiment of the present application.

DETAILED DESCRIPTION

The procedures described herein may be implemented using various information processing systems including distributed computing systems using various processors, storage and communications systems. For example, a server component may comprise a server computer available from Sun Microsystems or IBM. Servers may be distributed and may utilize load balancing and redundancy. Servers may also comprise Intel based computers such as PENTIUM microprocessor based computers. The communications channels may utilize systems having varying layers and protocols and may utilize Ethernet and TCP/IP systems. The communications channels may utilize Local Area Networks and may also utilize Wide Area networks such as the Internet.

Figure 12:
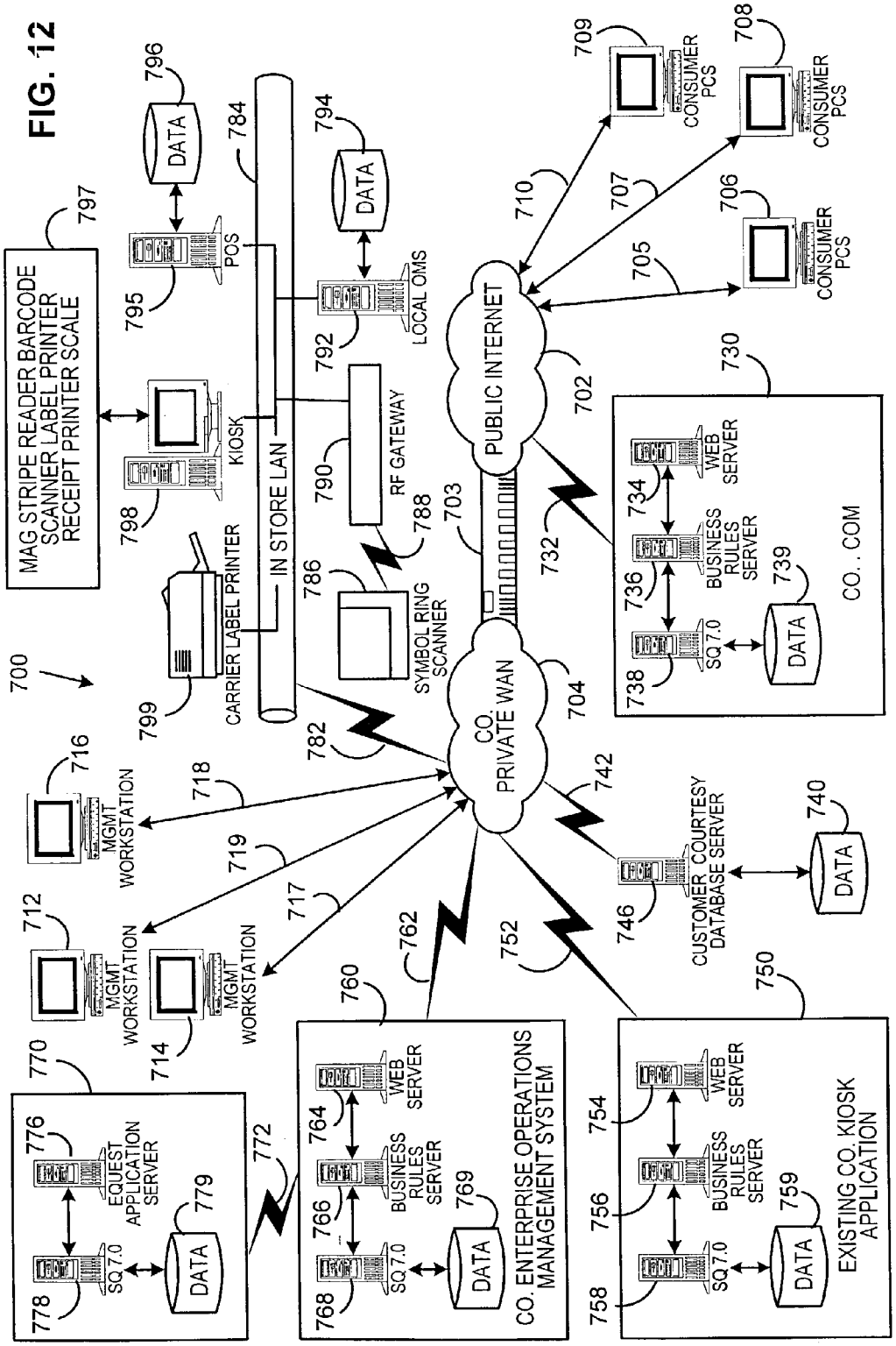
FIG. 12 is a schematic diagram of a representative system for processing shipping transactions according to illustrative embodiments of the present application.

Referring to FIG. 12, an illustrative data processing system 700 according to an illustrative embodiment of the present application is shown. In this illustrative embodiment, a private WAN 704 connects several store information systems including a customer courtesy system 740, a kiosk system 750, an enterprise operations system 760, an eQuest rating engine system 770, several management systems 712, 714 and 716 along with at least one in-store LAN 784. Additional stores may utilize similar LAN systems. The workstations may be connected to the private WAN 704 using connections 719, 717, and 718 respectively. Alternatively, an eQuest Technologies Business Intelligence Portal may be utilized.

The private company WAN 704 is connected to the Internet 702 using a communications channel 703 such as a T1 connection. Appropriate communications technology and systems are utilized including security components that are well known and not discussed further herein. The WAN 704 is connected to system 730 and other processors 706, 708, 709 using the Internet 702.

For example, consumer PCs 706, 708, and 709 may be IBM PC compatible computers, APPLE compatible computers or other processors connected to the Internet using connections 705, 707 and 710 respectively. A company may utilize a web server system 730 that is connected to the public Internet. For example, company web server system 730 includes a web server 734, a business rules server 736 and an SQL server 738 with data storage 739. The system 730 is connected to the Internet using connection 732.

The company also utilizes a CCSYS system 740 including a Customer Courtesy System with a Database Server 746 and database 744 all connected to the company Private WAN or Intranet 704 using connection 742.

The company utilizes a kiosk system 750 connected to the private WAN 704. For example, a kiosk server 754, a business rules server 756 and an SQL server 758 with data storage 759 may be utilized. The system 750 is connected to the Internet using connection 752. The Kiosk system may perform unrelated functions such as customer price checks.

The company utilizes an enterprise management system 760 connected to the private WAN 704. For example, an enterprise server 764, a business rules server 766 and an SQL server 768 with data storage 769 may be utilized. The system 760 is connected to the Internet using connection 762.

The company utilizes an eQuest shipping rating engine system 770 connected to the private WAN 704. For example, an eQuest server 774, and an SQL server 778 with data storage 779 may be utilized. The system 770 is connected to system 760 using connection 772.

The company utilizes an in-store Local Area Network (LAN) 784 connected to the private company WAN 704 using connection 782. Similarly, additional stores having similar LANs may be connected to the network. A carrier label printer 799 is connected to the LAN 784 as well as a kiosk system 798 that is operatively connected to system 797 including a magnetic stripe reader, barcode scanner, label printer receipt printer and a scale. As can be appreciated, many different configurations may be utilized. For example, a dimensional weighing unit may be utilized and various printing functions may be combined into one unit. A Point of Sale (POS) system 795 may have a database 796 and is connected to the in-store LAN 784.

A local operational management system 792 (LOMS) may comprise a database 794 and is connected to the in-store LAN 784. Additionally, a wireless gateway 790 may connect other devices to LAN 784 including a ring scanner 786 available from Symbol Technologies of New York using connection 788.

An illustrative embodiment with reference to FIG. 12 is described. A representative shopper travels to a retail store to purchase a gift and/or other items. She approaches the pre-register shipping kiosk, and by placing the items to be shipped on a color-coded package size recommendation tray, she selects an appropriate box. She puts it on a scale and scans the UPC on the box to begin the transaction. The kiosk application prompts the shopper to scan the first item to be shipped. If the item is a type of item that may be shipped (e.g. not hazardous material, high value item, high breakage item, firearm, etc.), the kiosk application prompts the shopper to place the item in the box. If the weight is known, it is verified against the incremental weight of the box. In either case, the UPC number and incremental weight are stored. The shopper is then promoted to scan and enter the remaining items to be shipped. The kiosk application then prompts the shopper to being the rating process. If she is an existing customer, she is prompted to swipe a courtesy card or enter an identifier such as a telephone number to get a record of their address and most recent shipping history. The shopper is prompted to select the destination address/zip and then to begin the rating process. The aggregate incremental weights of the box and items are then used in the rating process. The shopper is then shown the range of options/costs she has for shipping. If the shopper is interested, she selects the most desirable service or allows a default selection. She is then presented with the option to purchase optional services such as insurance and delivery confirmation. Once the optional and accessorial services have been identified, the shopper is prompted to enter in the consignee name, phone number, and e-mail address as well as her own information (if it is not already known). She then confirms the transaction. Once confirmed, two receipts are generated by the Kiosk application. One receipt is a temporary SKU label that reflects the total shipping charges and the other is a manifest for the box contents. The shopper does not seal the box and is free to place the empty box and its former contents into their shopping carriage. The Kiosk application sends the SKU number and shipping charges to the POS system and stores the package contents in a POS support database.

The shopper then approaches the register. The register associate, upon seeing the empty shipping box, takes the box as the first item to be scanned and scans it, placing it at the end of the register. This item scan triggers the POS to search the POS support database for the subsequently scanned items. If the item belongs in the box, the POS will indicate that the item is to be placed in the box. The indication may be an audio, visual or other indication. Otherwise, the items are placed in shopping bags as usual. When all of the items have been scanned, the checkout associate begins the closing process. If all of the items that were supposed to be in the box are now in the box, the checkout associate is directed to seal the box. The checkout associate gives the shopper a receipt containing a retail-specific package-tracking number. The shopper then takes her bags, and the sealed box to the store exit. There, the entry and/or exit greeter takes the box from the customer, scans the temporary SKU, and generates the shipping label. The entry/exit greeter applies the shipping label to the box and segregates it for later pickup by the carrier. The system then sends an email to the recipient to notify the recipient the she will be receiving a shipment. The temporary store database record for the transaction is then uploaded to an enterprise-level database for storage in case of track, trace, or returns processing needs.

If the shopper and/or the recipient wishes to track the package, she simply selects the tracking option at the co-branded Internet site and enters the tracking number as found on the bottom of the receipt. The information that is returned is a listing of the in-store activity (e.g. placed the following SKUs in the box at such a time, selected a carrier rating at such a time, paid for the transaction at such a time, the retailer accepted it at such a time), and then also a listing with the carrier package tracking information appended.

Even though the system indicated to the register checkout associate that a scanned item does not belong in the box, it is possible that a hazardous material could be introduced into the shipment. For example, a checkout associate may make a mistake, may be incompetent, or more have nefarious intentions. In an alternative, the customer would still have a one-payment experience at the checkout, but would then go to a post-checkout and pre-exit kiosk where the customer would once again place the box on the scale and then scan the shippable items and then place each of those items to be shipped into the box. The weight that was calculated in the pre-register kiosk would be compared with the weight at the post-register kiosk. If the weights are equivalent, the shipping label is generated and then applied to the box. This alternative eliminates the responsibilities of the checkout associate and the entry/exit greeter in the process but does introduce slightly more loss-prevention risk.

Figure 1B:
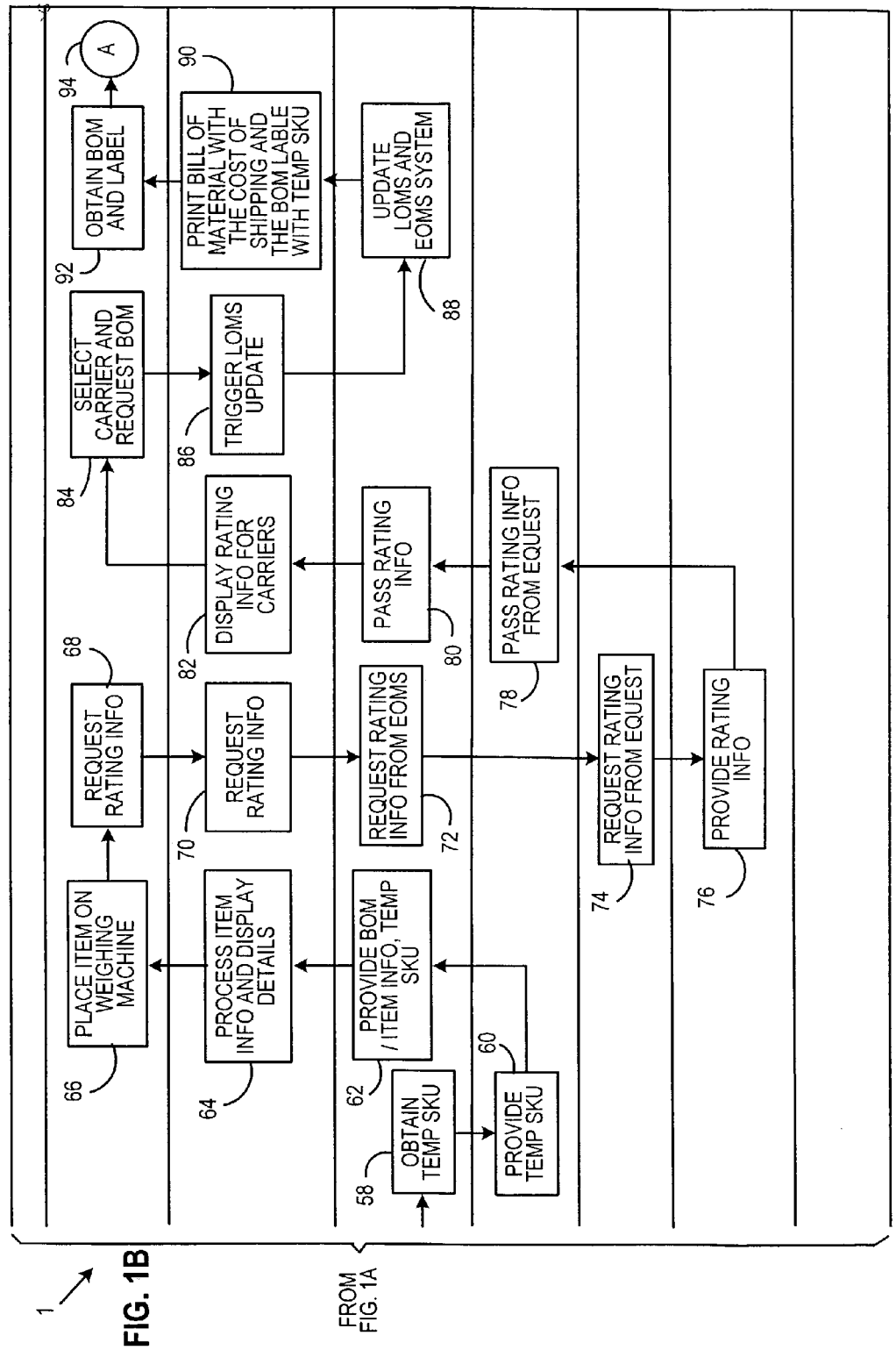
Figure 2:
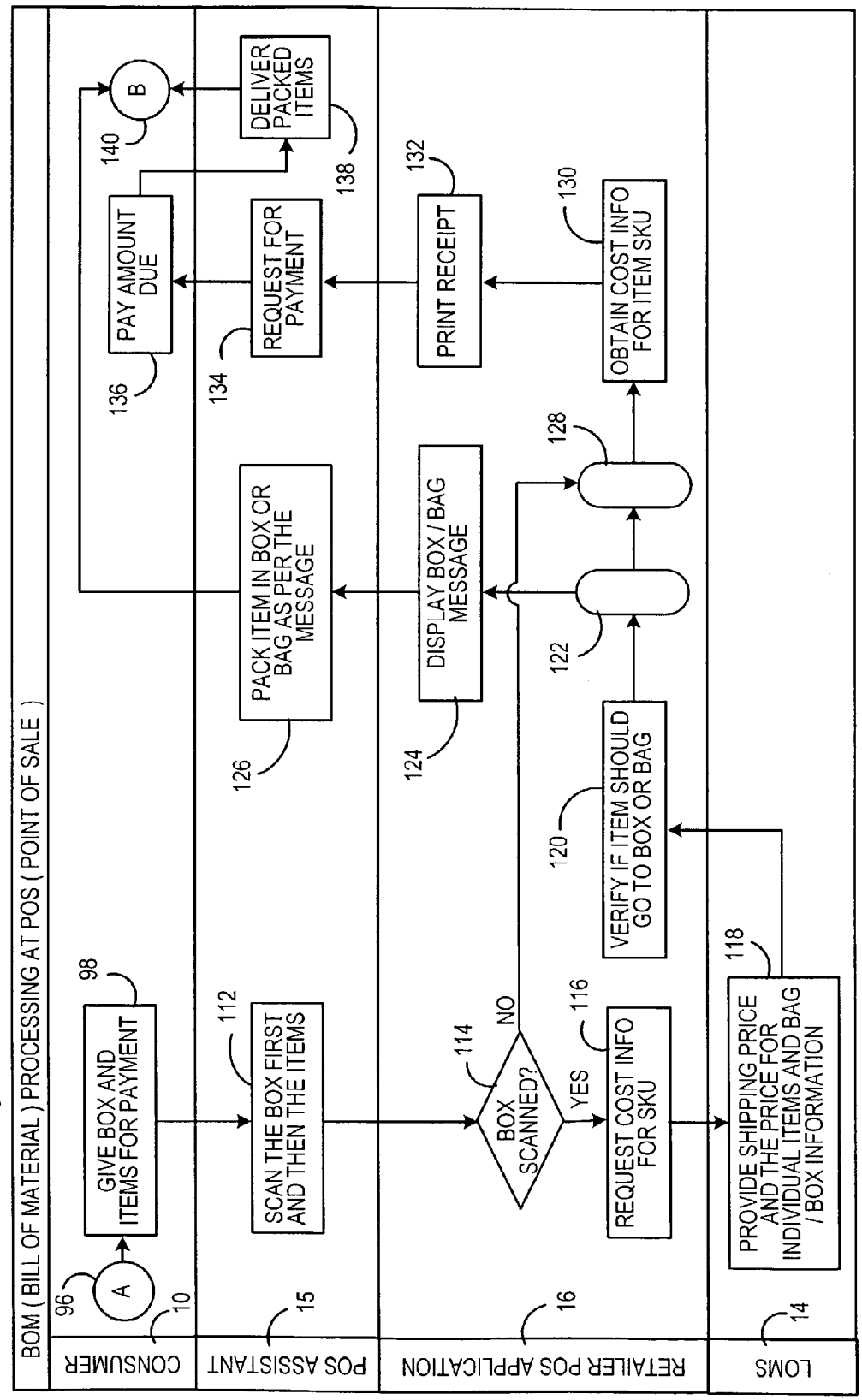
Figure 3:
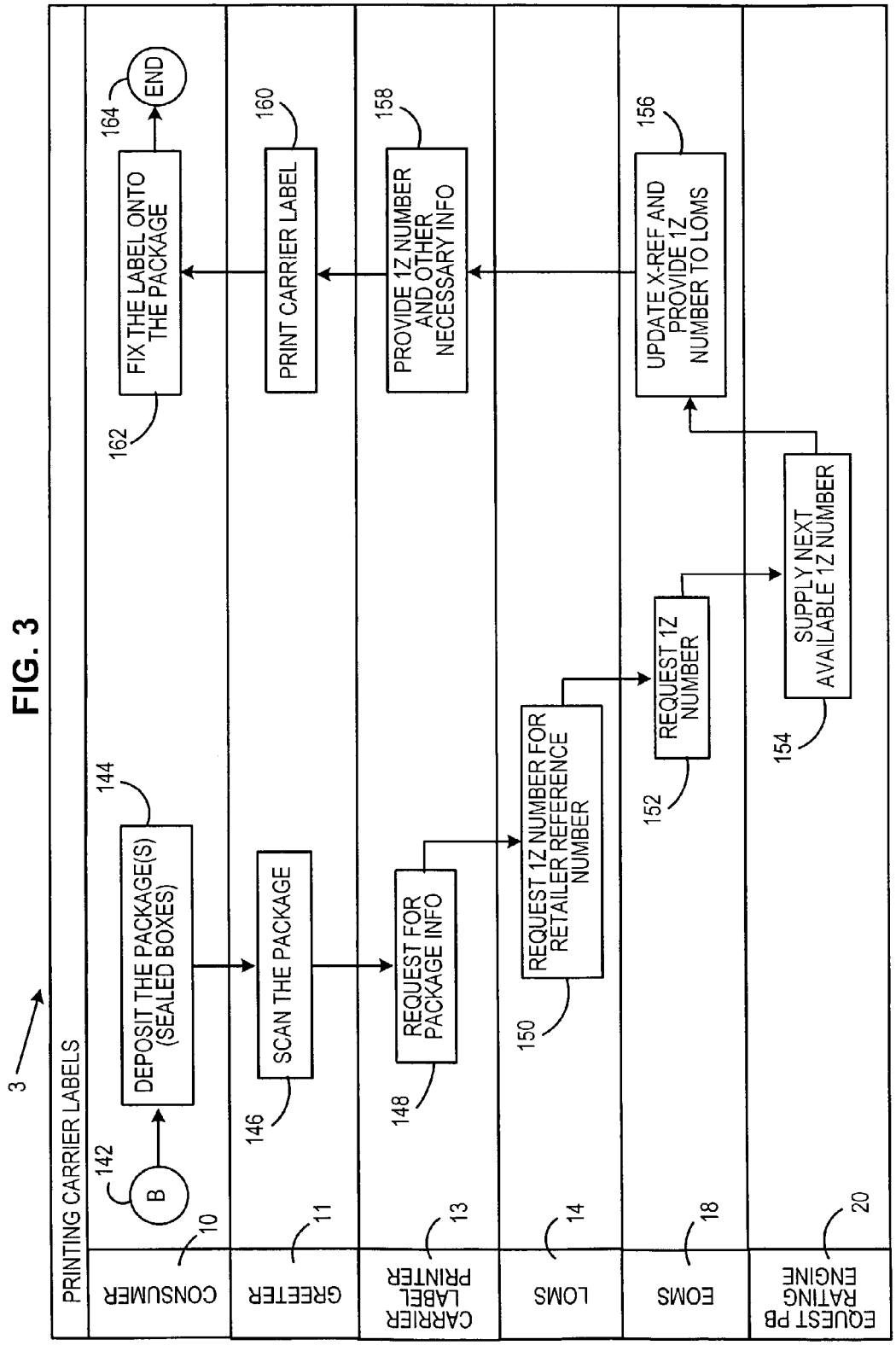
FIG. 3 is a flow chart showing a process for printing carrier labels according to an illustrative embodiment of the present application.
Figure 4:
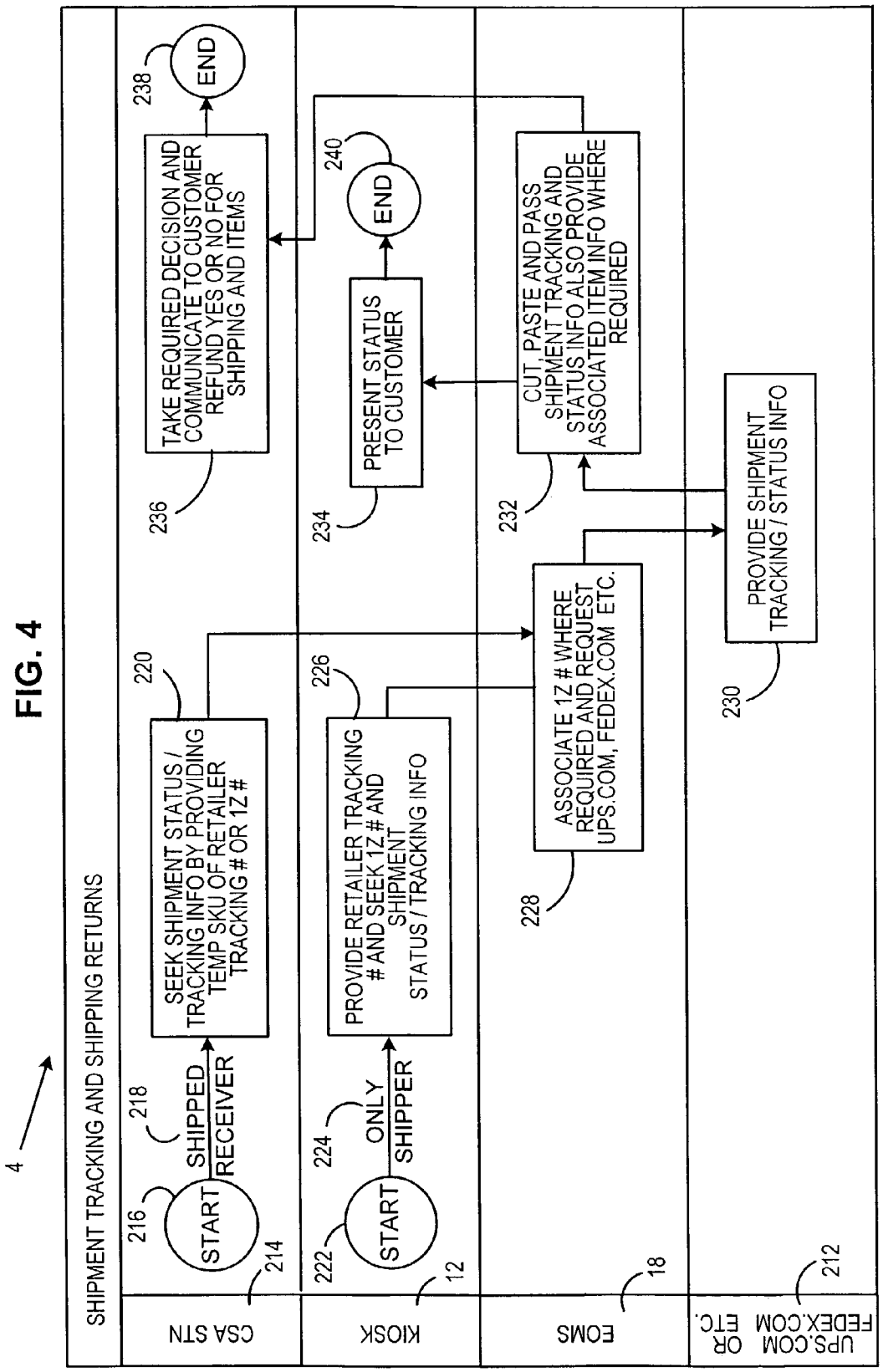
FIG. 4 is a flow chart showing a process for shipment tracking and shipment returns according to an illustrative embodiment of the present application.

FIGS. 1A, 1B, 2–4, 5A, 5B, 6, 7A, 7B, 8A, 8B, 9, 10, 11A, 11B, and 11C provide a description of several process flows according to illustrative embodiments of the present application. FIGS. 1A and 1B show a Generation of Bill of Material process flow. FIG. 2 shows a Bill of Material Processing at Point of Sale process flow. FIG. 3 shows a Printing Carrier Labels process flow. FIG. 4 shows a Shipment Tracking & Shipping Returns process flow. Several codes are used and described below.

The following codes are used to describe users, resources, systems or applications in an illustrative system according to an illustrative embodiment of the present application. A POS 16 is a Point of sales application. A EOMS system 18 is a Enterprise Operations Mgmt System. A LOMS system 14 is a Local Operation Management System. A KIOSK 12 is a Kiosk Application. An eQuest system 20 is an eQuest shipping rating engine Application (or other rating engine). A UPS.COM/UPS® system 212 is a delivery service system and related tracking system such as the system at UPS.com/ UPS®. A RCCSYS (or CCSYS) system 22 is a Retailer Customer Courtesy System or Customer Courtesy System. A Greeter station 11 is a Greeter station. A CSA station 214 is a Customer service associate. A Consumer 10 is a Consumer with a courtesy card (CC), without a card or new customer.

The following descriptions provide a short description of the systems in an illustrative embodiment, but the items have additional functionality and complexity as understood by one of skill in the art. A POS 16 (retailer point of sale application/system) is a Point of Sale system/application where the customer pays for the items purchased as well as the shipping costs. A EOMS system 18 (Enterprise Operations Management System) is an enterprise server that serves the needs of all the local operation management systems & KIOSK's in the retail outlets. A LOMS system 14 (Local Operation Mgmt System) handles all the temporary transactions among the systems in a retail outlet till the sale is complete. A KIOSK system/application 12 is responsible for producing a bill of material and a box label.

An EQUEST rating engine software application 20 available from Pitney Bowes Inc. of Stamford Connecticut is used to provide shipping alternatives and shipping costs for any particular package at the kiosk or at other stages. Other rating engines are known and may be utilized as alternatives. The items UPS.COM/FEDEX.COM 212 refer to some of the possible carrier systems that the retailer may use to cross-check tracking information. The related carrier information services are utilized. The RCCSYS (Retailer Customer Courtesy System) or CCSYS 22 includes a repository that contains customer information maintained by the retailer. The Greeter Station 11 is where the greeter accepts the package from the customer 10 after the point of sale transaction. At the greeter station 11 the shipping label is printed and applied to the package, which is now ready for the carrier. The CSA Station 214 is a station at which a customer can look up the shipping status of a package by providing the retailer tracking number or the carrier service tracking number. Finally, the Consumer 10 is the customer at the retail outlet that may have a courtesy card and may or may not be a new customer. Additionally, the customer 10 may have a database entry in the retail database or other available database.

As known in the art, credit cards, and driver licenses may link to or provide electronically available information about a customer or may also be scanned to provide such information.

An EPOS is an Enterprise POS and is used in an alternative. An EKIOSK is an Enterprise Kiosk Application. A CSA is a Customer service associate. A Manifest station is a shipping back office station that may be used to aggregate packages for a carrier.

In another illustrative example, large retailers may want to provide a discounted shipping solution for the customers in the store. They also may look for ways to encourage customers to shop at and visit the company web site. A customer visiting a retail store may be in the process of purchasing a gift that needs to be shipped to a remote destination. The customer may prefer to have the option to ship an item and pay for the shipping at a discounted price within the store by using any of the multiple large carriers. Further, the customer may prefer receiving a discounted wholesale price for shipping the package via the retailer. The customer may want to track the package and may also want the option to notify the recipient electronically about the arrival details of the package. The retailer on the other hand may want to offer discounted shipping prices to its customers that would encourage customers to shop and ship within its facility. The system of this embodiment also automates the process of notifying the respective carrier of the number of packages that it needs to pick up.

The customer ships the item within the domain of the retailer by using a kiosk. The customer uses the kiosk to enter customer and recipient information, scan items that need to shipped, calculate the weight or other data that is used to calculate shipping costs by a variety of carriers. The kiosk provides the customer with a price quote such as the best price available from among multiple carriers to ship the item at a discounted wholesale price. The customer is also allowed to choose a shipping solution based upon carrier brand preference rather than the lowest cost. The customer is given temporary receipt by the kiosk that shows all the items that are being purchased along with the shipping costs chosen by the customer. Furthermore, the kiosk also prints out a temporary barcode that may be stuck on to the box by the customer. At the point of sale checkout, the barcode on the box is scanned for verification of the items and the box is then sealed when the sale process is completed. The customer has a tracking number printed on the receipt that may be used by the customer to track the package. The customer hands the package to the retailer associate before exiting the store. The retailer associate scans the barcode on the package and generates a shipping label that contains the customer and recipient information that is then applied on the package. At this point, the retailer notifies the recipient electronically that a package is on its way and provides the details of its arrival. It also provides a tracking number that the recipient could use track the package. This tracking number is the number that the retailer provided on the receipt at the point of sale to the customer. The customer and recipient can track the package by visiting the retailer web site. Such tracking increases traffic to the retailer web site. Finally the customer does not need to carry a package to a carrier location and is provided affordable shipping at the retail outlet.

In certain embodiments, the Kiosk prepares a temporary shipping sale-tracking number that is held open as a temporary number for a specified amount of time. If the customer processes the shipping sale before it expires, the shipping sale tracking number is made permanent and entered into the enterprise wide system.

In another embodiment, the customer does not use a Kiosk, but brings the items to the point of sale checkout to be processed. The Kiosk system has the advantage of preprocessing sender, recipient and shipping information. However, a point of sale processing system may be utilized. The required sender and recipient information may be acquired using many input methods and systems such as voice recognition (by a checkout person or a computer), a scanning device, a customer database lookup device or an electronic writing device. Address information may be confirmed and cleansed using known systems.

In another embodiment, the rating engine provides shipping choices that may be sorted by any one or more of cost, time to deliver, insurance availability and other known shipping criteria.

In another embodiment, the shipping cost charged to the customer is input into an accounting system as revenue and a cost of goods is input into the accounting system. In one embodiment, the cost of goods includes the actual shipping cost charged by the carrier. In another alternative, other costs are input including shipping materials and handling charges.

In another embodiment, the rating engine utilized is the Transportation Management System (TMS) available from Pitney Bowes Inc. of Stamford, Conn. Point of sale systems, hardware and software are known and such systems are often customized for a particular retailer using known techniques.

The various elements of the systems described and used in the processes described may be off the shelf systems that include non-utilized features.

In another embodiment, the system provides UPC/SKU to shipment ID association, in-store job tracking, an interface to a rating engine, an interface to the retailer website, an interface to the retailer POS system, an interface to a courtesy card DBMS, and an interface to an in-store Shipment Prep Kiosk or multiple Kiosks in a store. The system provides management reports and archive management. The system may use an existing Kiosk system for some or all of the Kiosk functions and may provide additional Kiosk modules as needed. The system provides an Interface to a Local and/or Enterprise Operation Management System.

The system also provides voice and/or video annunciation and on-line help that are internationalized. The system uses an in-store server to interface with the local POS system.

In another embodiment, the system may restrict shipments based upon weight criteria, geographic criteria, dimension criteria and other known shipping restriction criteria.

In an embodiment of the Local Operations Management System, the system provides Label data storage and generation, UPC/SKU shipment association, POS integration (checkout response), a label printer interface, a Greeter's Symbol ring scanner RF interface, and an Interface to an Enterprise Operations Management System.

In a Kiosk or POS customer Identification system embodiment, the system provides for customer identification using card swipe access and customer data file access. A welcome greeting is provided with options for the user including Ship package, Track package, Edit shipment, Change of address, and Request customer courtesy card. The Kiosk supports voice and video annunciation in many languages and is integrated with native store applications.

In an alternative, the shipping system prompts a user to select a box, scan the box, put the box on the scale, and verify the weight of the box. For all desired shippable items, the user then scans the UPC code and places it in the box. If the scanned item is a Hazmat such as an illegal to ship item (e.g. ammunition or fireworks) the customer is not allowed to associate the item with the shipment. The weight of the item is then registered. When the user indicates that the last item has been scanned and placed, the total value of the shipment is displayed. The user is then asked whether she wants insurance. When all the accessories are defined, the customer begins the rating process. She is prompted with previous addresses shipped to in the past or given the choice to enter a new destination address. The system then validates the selected address. The system rate shops the shipment and displays the options to the user. The user then selects the class of service. The user then accepts the cost of the options selected. The user is presented with a SKU label to apply to the package and a receipt indicating the SKUs and the associated item cost that are associated with the shipment, the cost of the accessories, and the total cost of the transaction.

In this embodiment, the system includes a table in the store system, enterprise POS or Local OMS that stores for each box SKU the price of the box, its dimensions and weight for rating and fraud detection purposes. Once the SKU for the box has been scanned and the box placed on the scale, an empty transaction table is created in the local OMS to associate UPCs and SKUs with the shipment. A unique transaction ID is generated to refer to the shipment. For each scanned item placed in the box, an additional row is created in the transaction table for capturing the UPC/SKU number, the incremental weight, and the price of the item from the POS system. There can be multiple concurrent transactions per store. The local OMS maintains the "business rules" for the retailer used for determining what can be shipped based on UPC/SKU numbers, value limits, Hazmat restrictions, carrier restrictions, or shipping legality information. Standard carrier insurance rates are maintained in the eQuest system. An insurance rating request event would be sent from the Kiosk to eQuest via the local OMS. If the user requests insurance, the value is associated with the Transaction ID for this transaction in a record for all POS chargeable accessories (e.g insurance, delivery confirmation). In an alternative that does not utilize a full Corporate Transportation Authorization System, there are at least 2 shipper numbers per store, one for customer shipments and one for in-store shipments generated by the existing shipping solution. The eQuest system performs the Kiosk shipper number maintenance across the entire enterprise.

At the time of installation, the local OMS which is serving one or more Kiosks is configured with the store's address and store number. The store number is the key that the eQuest system uses to look up the shipper number. The Kiosk or local OMS sends up enough data to rate the package such as dimension data, weight, and source and/or destination address and store number. The Enterprise OMS maintains the past transaction history per user for an amount of time that may be set as a parameter. That transaction history is sent to the local OMS at the time the user identifies herself (via card swipe or other means). The eQuest system or other product provides the address hygiene service. The rating process is performed by the eQuest Intellishop system, being invoked in a nonstandard fashion. Intellishop uses the published UPS rate table. Before the user selects the C.O.S., eQuest will generate a BillNR. The Store ID should be in the BillNR.

When the user confirms the costs, the unique BillNR generated by eQuest is associated with the current transaction referenced by the transaction ID in the local OMS. The transaction is "closed" and the transaction state is elevated to "Waiting for Payment" from "Waiting for Shipment." The Local OMS generates a temporary type 40 SKU with the combined shipping charges for the local POS system. The local OMS generates the SKU label data for the Kiosk to print out. The Local OMS forwards the receipt data for the Kiosk to print out.

In an embodiment of the Checkout/register process, the Associate sees the shipping box and scans box the temporary SKU number. The Associate then scans each item and is prompted to place the item in the box or in the bag. At the end of the checkout process, the associate manages any exception conditions and then seals the box. The associate hands control of the now sealed box and the other bags to the shopper and hands her a receipt containing the total shipment charges and the retail store shipping tracking number that can be used for tracking purposes on the retail website. The associate then preferably thanks the shopper for shopping at the retail store. A number of exception conditions may be encountered when the total value of the transaction is provided. For example, the customer may not have the funds to complete the purchase. Or, the items that the POS or Local OMS expects to be in the shipment do not show up at the register.

When the POS recognizes the shipment SKU number, the POS requests data from the local OMS for each UPC scanned at the register to determine if that UPC is associated with the shipment. If the UPC is associated with the shipment, the POS alerts the associate to divert the item to the unsealed box. The retail tracking number generation does not add time to the checkout process. At the time the box SKU is scanned, the POS system triggers the Local OMS to send an event to the eQuest system with the data including the data for the BillNR, COS and options in order to create a rated shipment, carrier tracking number, and label data. The local OMS sends an event to the Enterprise OMS with the carrier tracking number in order to generate a unique retail tracking number. The Enterprise OMS generates the retail tracking number and returns it to the local OMS. The transaction table in the OMS reflects that the item had been scanned in the register and placed in the box and is time and date stamped. The POS system alerts the associate of any incomplete transactions such as any transaction in which the system expected to scan 10 items and only scanned 9. The eQuest system returns the carrier tracking number and label data to the local OMS. The local OMS will associate the carrier tracking number with the transaction. The local OMS will also send an event to the Enterprise OMS with the carrier tracking number to generate a unique retail tracking number. The Enterprise OMS generates the retail tracking number and returns it to the local OMS that associates it with the transaction record and then forwards it to the POS system. The POS system then prints the retail tracking number at the bottom of the receipt. The local OMS transitions the transaction state from Waiting for Payment to Waiting for Acceptance.

In an embodiment for retail acceptance of the packages, the Greeter ring scans the temporary SKU label on the sealed box. The Greeter retrieves the carrier label from the label printer in his area and applies it to the package. The Greeter takes control of package from the customer and scans the carrier label. The Greeter takes package and puts it on a 6-wheel cart. When the cart is full, it is sent to the back of the store and the customer packages are consolidated with the store packages for pick up. The Symbol RF ring scanner and RF gateway are attached to the in-store network. The Temporary SKU acts as an index into Local OMS transaction record to retrieve label data to be printed at the Greeter station. When the carrier label is scanned, the local OMS sends an event to the eQuest system requesting it to load that package in the store manifest. The local OMS sends the entire transaction history to the Enterprise OMS so that the Enterprise OMS may retrieve the in-store shipment history as well as query the carrier site and retrieve the carrier history. The consolidated store and carrier history is returned to the retail web site. For notification purposes, the eQuest system batch tracking capability is utilized. The Equest system will forward delivery confirmations by carrier tracking number to the Enterprise OMS on a scheduled basis or as they occur. If the shopper had entered in her e-mail address during the shipment creation process, she will receive notification that the shipment was delivered with an embedded URL pointing to the retail website.

The rating engine can be used to process local, geographical or enterprise wide end of day data runs.

In an embodiment having management reports, the reports available include store within a store, store consolidated, district consolidated, region consolidated, and corporate consolidated reports. The report types (by day, week, month, quarter, and year) include an insurance report, revenue reports, shipping reports and detailed reports. The reports may include data such as the number of pieces, the actual and/or average revenue per piece, the actual and/or average fully absorbed cost (FAC) per piece and the actual and/or average profit per piece. The reports may include data such as the actual and/or average number of items per shipment, the actual and/or average item revenue per shipment, the actual and/or average number of transactions started but not completed, and the actual and/or average number of register exceptions. The data may also include the actual and/or average number of returns, the number of retail web tracking hits, loss prevention reports and traffic reports by carrier and by lane.

The Enterprise OMS provides logon, authentication, access rights, and user account management functions.

In another embodiment, a PLD is sent for each shipper ID. However, packages having multiple shipper IDs may be batched in one transaction. The eQuest system can export data in at least three ways. A DataMapper, which is a batch utility triggered by the Task Scheduler, is used to provide custom exports. Data is sent to the Enterprise OMS for reporting and archiving. Accordingly, the eQuest system is relieved of the archival burden. eQuest also supports an ODBC interface as well as other standard interfaces.

The eQuest system can defer loading the package in the manifest even though the carrier tracking number and label have been generated from its perspective. There are two approaches that may be utilized. First, an interim state using conditional logic may be utilized. Second, the transaction within eQuest is not committed until customer reaches the Greeter station in order to maintain data within temporary tables and defer carrier tracking number and label generation. If the package is rated on published rates, the discount is applied in the management reports by making the discounted rate available in the Enterprise OMS for reports.

In an embodiment of a shipping charge return and refund system, we assume the package was captured by a greeter, lost in transit or is a 30 day return. The Customer service associate (CSA) gets a receipt with shipping charges and a retail tracking number. The CSA checks the status of the shipment to see if it is eligible for refund. The CSA the gives a refund for shipping charges, if eligible, and the CSA may also refund the items contained in the shipment. The Enterprise OMS maintains transaction and shipment history data for all stores for a period of that is for example at least 30 days. There is a permanent SKU for shipping charge refunds.

A CSA could check the status of a shipment through a similar tracking application available to the Customer on the Kiosk. The GSA application is hosted on the same Enterprise OMS. Item refunds are facilitated through the existing refund process with the exception that individual SKUs are not read by the scanner, they are read in from the transaction record stored in the Enterprise OMS.

In an embodiment of a Checkout exception process, the Customer does not have enough money for the entire transaction, wishes to return an item and requests a partial shipment, or wishes to void the shipping charges. The checkout process should not be slowed by the shipping application. The Customer may decide to not pay for a particular item, but the shipping charges remain fixed. The Customer is prompted to accept the shipping charges or void the entire transaction. Partial shipment decisions at the register are not allowed. The Kiosk warns the Customer of the business rules before the rating process is complete. To void the shipment, the POS sends an event to the local OMS to mark the transaction record as voided. The local OMS issues a void event to eQuest via the BillNR.

In another embodiment, a process for modifying a shipment after having confirmed the shipment but before reaching hitting the register is described. The customer puts a box on the scale and the customer scans the temporary SKU. Using the receipt, the user puts the items associated with the shipment in the box. The kiosk performs weight verification of shipment. The Kiosk then prompts the user to scan each item to be removed or added. The rating process and subsequent steps are repeated as above. The new receipt is generated and provided to the user. The same SKU label can be applied. When items are to be removed from the box, the incremental weight of the item (captured when it was originally placed in the box) is deducted from the total weight in the re-rating process. The modified weight, rate, and other data is updated in the local OMS. The local OMS is able to re-associate a new shipping charge with the temporary SKU in the POS. If it cannot, the temporary SKU needs to be deleted, a new one generated, and a new label printed to be applied on the box.

In another embodiment, if a customer refuses to give the package to a greeter, the customer is not allowed to bring the package back into the retail store for shipping after she leaves the store. The customer would still be eligible for a shipping charge refund, but not an item charge refund. The customer would receive a proactive notification (by e-mail) if the package were not received by the store.

The eQuest system will not manifest such a package since it was not accepted, but a record will be maintained. During the batch tracking process, eQuest will forward the related information to the Enterprise OMS for reconciliation reporting and shipper proactive notification. There is a configurable amount of time after the register transaction and before the greeter transaction when it is assumed that the package has not been received by the store.

In an embodiment for retail acceptance of the packages, the Greeter ring provides confirmation of delivery.

In another embodiment, the label printer at the greeter station could be used to apply labels for people bringing in return purchases from a loss-prevention standpoint.

In another embodiment, the retailer may decide to self-insure all shipments or certain shipments based upon a set of criteria. The UPC and SKU tables will be maintained by the same in-store system that is administering the local POS system. For SKUs which are already shipment ready (e.g. not blister packed such as with TVs, VCRs, and the like), the dimensions and the total weight is captured. The SKU may be used to determine if a package should be further packaged with protective devices in packaging. The table of illegal UPCs is administered by the associate that is maintaining the local POS and defining the shipment ready weight for the local SKUs.

Referring to FIGS. 1A, 1B and 2, a process for generating a Bill of Materials (BOM) is shown according to an illustrative embodiment of the application.

Referring to FIGS. 1A and 1B, the process diagram 1 is shown as a flow diagram with horizontal bands according to the system or actor associated with a particular process entity. Consumer (customer) 10 is a retail shopper in a store in this illustrative embodiment. Kiosk 12 includes an interactive terminal and may include peripherals. The kiosk 12 may be a general-purpose kiosk and may also perform other functions. The LOMS 14 is shown. A representative retail store POS Assistant 15 is shown and the retail store POS application 16 is shown. The EOMS 18 is shown and the eQuest rating engine 20 is utilized to provide rating information. The RCCSYS system 22 is a customer care system and is utilized to access customer details. The same reference numerals are used for the subsequent embodiment and it is understood that the systems and actors are illustrative and may have different features in different embodiments.

The process for generating a bill of materials begins in step 30. In step 32, the customer 10 performs a logon operation to the kiosk 12. In step 34, the kiosk 12 validates the login information and proceeds to step 36 for a validation test. If the logon information is not valid, the kiosk 12 proceeds to step 37 to process an error routine such as displaying an error message. If the logon information is valid, the kiosk 12 proceeds to step 38 to initiate a request for customer information. The process then proceeds to step 40 in which the RCCSYS customer care system 22 provides customer details. In step 42, the kiosk 12 displays a welcome message and kiosk screen to the customer 10.

At step 44, the customer 10 enters data such as address information. In step 46, the customer 10 scans an item that could be a box, a pre-packaged item or other item. In step 48, the kiosk initiates a request for information regarding the item to the LOMS system 14. In step 50, the LOMS system 14 checks whether a valid item identifier was provided. If not, in step 52, the kiosk 12 displays an error message to the customer 10 and in step 54 the customer 10 may decide to rescan or scan another item returning to step 46. If the LOMS system 14 finds a valid item, the system proceeds to step 56 to determine if the item is a box or pre-packaged item and then in step 58 the LOMS system 14 requests a temporary SKU identifier. In step 60, the POS application provides a temporary SKU identifier and in step 62, the LOMS system provides box or item information and the temporary SKU to the kiosk 12. In step 64, the Kiosk 12 processes the item information and displays the details. In step 66, the customer 10 places the item or box on a parameter measuring device such as a weighing machine or scale. In step 68, the customer 10 requests rating information. The kiosk 12 then processes the rating request in step 70 and in step 72, the LOMS system requests rating information from the EOMS system 18. In step 74, the EOMS system 18 requests rating information from the eQuest system 20 and in step 76, the eQuest system 20 provides rating information to the POS system 16.

At step 78, the POS system 16 passes the rating information from eQuest system 20 to the LOMS system 14, which in step 80 passes rating information to the kiosk. In step 82, the kiosk 12 displays rating information for one or more carriers. In step 84, the customer selects a particular carrier and requests a bill of materials. In step 86, the kiosk 12 triggers a LOMS system update. In step 88, the LOMS system 14 updates the LOMS system 14 and the EOMS system 18. In step 90, the Kiosk 12 prints the bill of materials with the cost of shipping and the box label having a temporary SKU that may be coded in a bar code. In step 92, the customer obtains the bill of materials and the label. In step 94, the process comes to point A.

Referring to FIG. 2, the process diagram 2 starts in step 96. In step 98, the customer 10 gives the box and the items to the POS assistant 15 for payment. In step 112, the POS Assistant 15 scans the box first and then scans the items that are to be shipped in the box. In step 114, the system determines if a box was scanned. If not, the process proceeds to step 128. If a box was scanned, the process proceeds to step 116 and the POS application 16 requests cost information for that SKU. In step 118, the LOMS system 14 provides a shipping price and the price for the individual and the bag/box information. Then in step 120, the POS application 16 verifies if the item should be placed in the box or bag. Then in step 122, the process may proceed to step 124 to display the box/bag message and in step 126 the POS assistant 15 is packing items in the box or the bag as per the instructions in the message. Then the system reaches step 140.

If the system proceeded to step 128, then in step 130, the POS application 16 obtains cost information for each item SKU. In step 132, the system prints a receipt. In step 134, the POS Assistant 15 will actually ask for money and in step 136, the customer 10 pays the bill. Then in step 138, the POS Assistant 15 delivers the packed items for outgoing delivery and then reaches point B in step 140.

As can be appreciated, some of the steps above could be implied. For example, in step 84, the system could automatically choose the carrier with the best rate within the parameters of a stored profile or run time profile data.

Referring to FIG. 3, a process for generating printer carrier labels is shown according to an illustrative embodiment of the application. The process diagram 3 is shown as a flow diagram with bands to indicate the system or actor of a step as above. In step 142, the customer 10 starts the process and in step 144 the customer deposits the package. In this embodiment, the customer provides the package to the greeter 11 and the package is sealed. As can be appreciated, the greeter 11 could alternatively inspect and seal the package. In step 146, the greeter 11 scans the package. The scan may be used to obtain an identifier. The carrier label printer system 13 makes a request for the package information at step 148 and the LOMS system 14 then requests a carrier identifier such as the identification number or "1Z" number from the appropriate system in step 150. In step 152, the EOMS system 18 requests the carrier identifier.

In step 154, the eQuest system 20 supplies the next available identifier as appropriate. In an alternative, the eQuest system 20 may consider the type of the package and other factors in the selection. In step 156, the EOMS system 18 updates the cross reference to the package record and provides the identifier to the LOMS system 14.

In step 158, the carrier label printer system 13 obtains the information necessary to print a label and in step 160, the greeter 11 prints a carrier label. In step 162, the customer 10 affixes the label to the package and in step 164 the process ends. As can be appreciated, different systems or actors can perform certain steps of the process. For example, in this embodiment, the greeter 11 could perform step 162.

Referring to FIG. 4, a process for shipment tracking and shipment returns is shown according to an illustrative embodiment of the application. The process diagram 4 is shown as a flow diagram with bands to indicate the system or actor of a step as above. In step 216, a first process branch 216 starts at a GSA Customer Service station 214 and can be used by package shippers or intended recipients 218. In step 220, the shipper or receiver seeks shipment status/tracking information and provides an identifier such as the temporary SKU, retail store tracking number or shipper tracking number. In a second branch of the process, in step 222, a shipper 224 may utilize a kiosk 12 and may seek shipment status/tracking information and provides an identifier such as the temporary SKU, retail store tracking number or shipper tracking number in step 226. Thereafter, each branch proceeds to step 228 and utilizes the EOMS system 18 in associating the identifier provided with a shipper identifier as needed. In step 230, the EOMS system 18 requests information from the shipper 212 and the shipper 212 provides it to the EOMS system 18.

In step 232, the EOMS system 18 parses the shipment information received as needed. In this step, templates for each carrier may be used to extract the relevant data. Additional information regarding the package may be obtained by the EOMS system 18 in this step. This information is then passed either in the first branch in step 236 to the CSA station 214. In this branch, the CS station 214 assistant will take the appropriate action. For-example, the customer can be provided tracking information if that was the request. If it is a refund request, the CSA station 214 assistant will process the refund decision. Then the process ends in step 238. In the second branch, the shipping status information is provided to the kiosk 12 and in step 234 this information is provided to the shipper and the process ends in step 240.

Figure 5A:
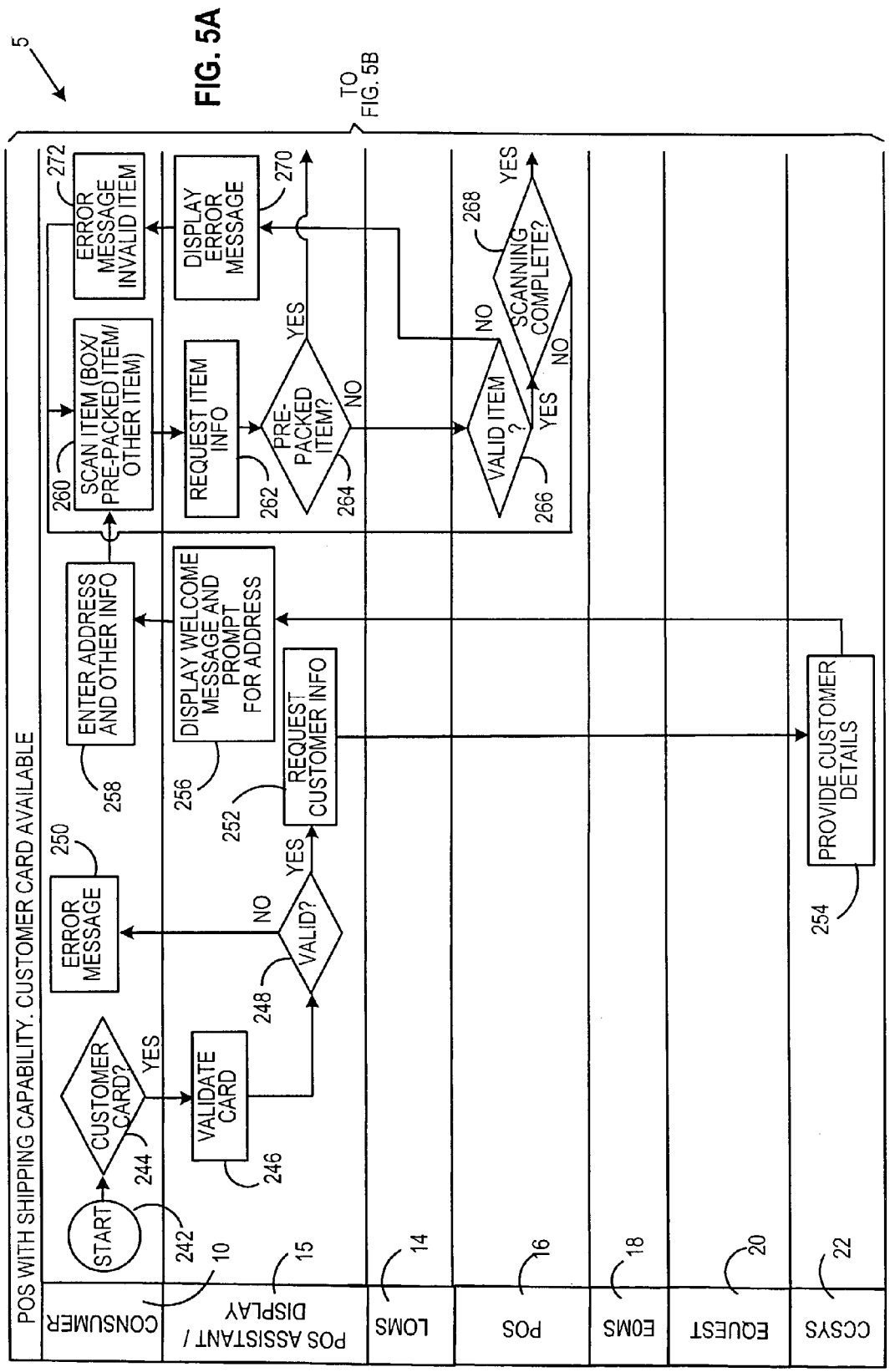
FIGS. 5A and 5B are a flow chart showing a process for a shipping transaction according to another illustrative embodiment of the present application.
Figure 5B:
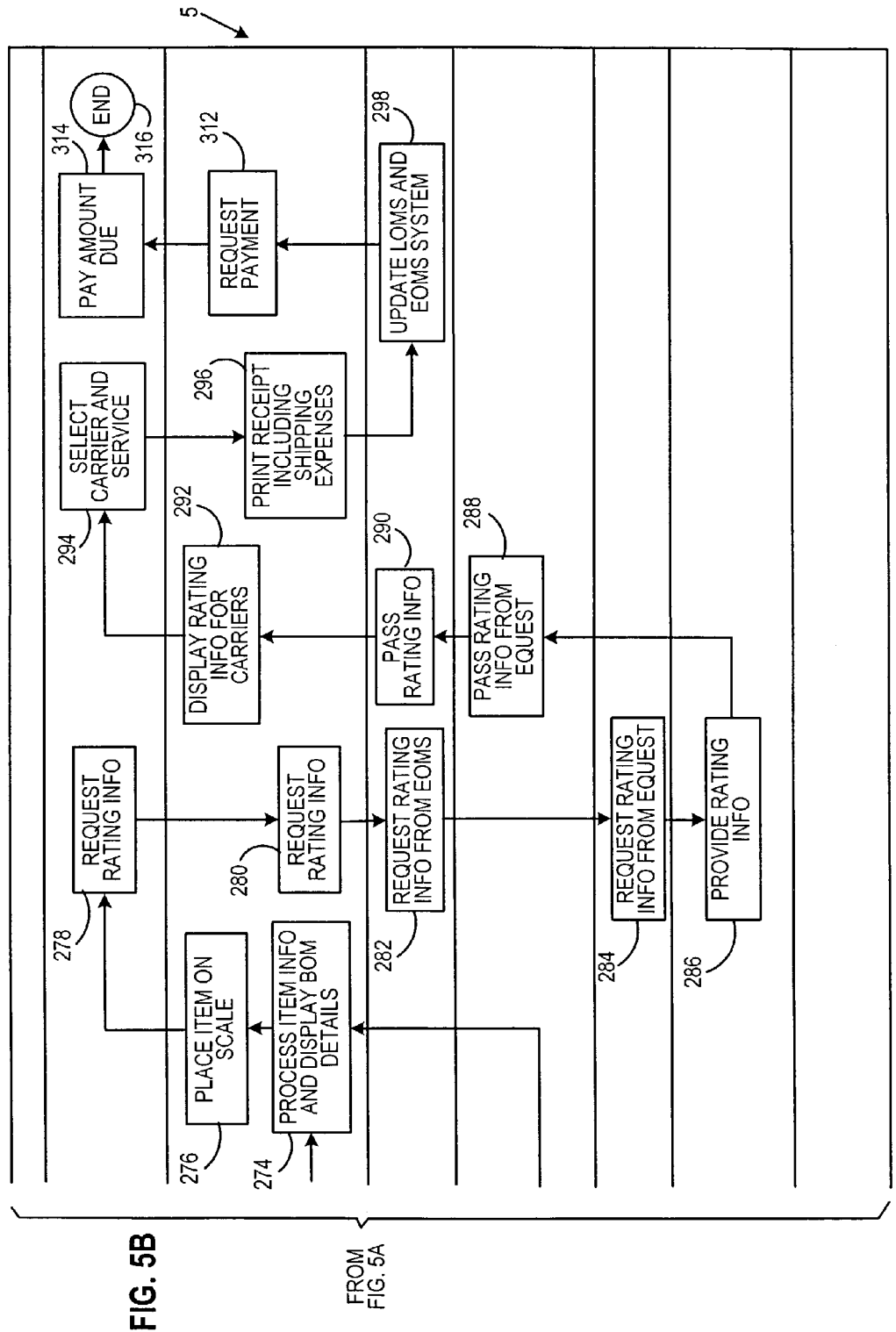

Referring to FIGS. 5A and 5B, a process for providing a Point of Sale POS shipping capability is described according to an illustrative embodiment of the application. The process diagram 5 shows a process where a customer care card is available.

As can be appreciated from the following description, the customer care card or other identifier allows certain information to be fetched for the transaction without the need for capturing the information from the user at shipping time. For example, information that is fairly static such as the customer return address could be stored.

The process begins in step 242 and the customer 10 presents an identifier such as a customer care card in step 244. If the identifier is not recognized, the process stops. In step 246, the POS assistant/display system 15 validates the card and in step 248, the card identifier is tested and if not valid, an error message is provided in step 250. If the identifier/card is valid, in step 252, customer information is requested. In step 254, the CCSYS customer care system 22 provides customer details.

In step 256, the POS Assistant/Display system 15 displays a welcome message to the customer 10 and requests destination information. For example, the customer 10 may be prompted to choose from a pre-stored selection of previously used addresses or from a list of intended recipients previously entered. The customer 10 may also be prompted to enter intended recipient information at the POS Assistant 15 and may utilize a keyboard, voice recognition or other data input methods in step 258. In step 260, the customer scans the item, box, package, pre-packed item or other item. The POS Assistant 15 then requests item information in step 262 and checks for a pre-packed item in step 264. If it is not a pre-packed item, the system proceeds to step 266 at the POS 16 to determine if it is a valid item. If it is not a valid item, the process proceeds to step 270 to display an error message to the POS assistant 15 to provide an error message to the customer in step 272 to allow the customer to scan another item in step 260. If it is a valid item in step 266, the process determines that the scanning is complete in step 268 and if so, the proceeds to step 274. If scanning is not complete, the process proceeds to step 272 to provide an error message. Similarly, if a pre-packed item is found in step 264, the process proceeds to step 274 and the POS Assistant 15 processes the item information and gets the display of BOM details. In step 276, the POS Assistant places the item on a parameter capture device such as a scale. In step 278, the customer 10 requests rating information and in step 280, the POS Assistant 15 requests rating information for the carriers. In step 282, the LOMS 14 system requests rating information from EOMS. In step 284, the EOMS system 18 requests rating information from eQuest 20. In step 286, the eQuest system provides rating information to the POS 16. In step 288, the POS system 16, pass the rating information to the LOMS system 14 in step 290. In step 292, the POS Assistant 15 displays rating information for carriers. In step 294, the customer is able to select a carrier and a service. In step 296, the POS Assistant prints a receipt including shipping expenses. In step 298, the LOMS system 14 updates the LOMS data and EOMS system data. In step 312, the POS Assistant 15 requests payment and in step 314, the customer 10 provides payment. The process ends instep 316.

Figure 6:
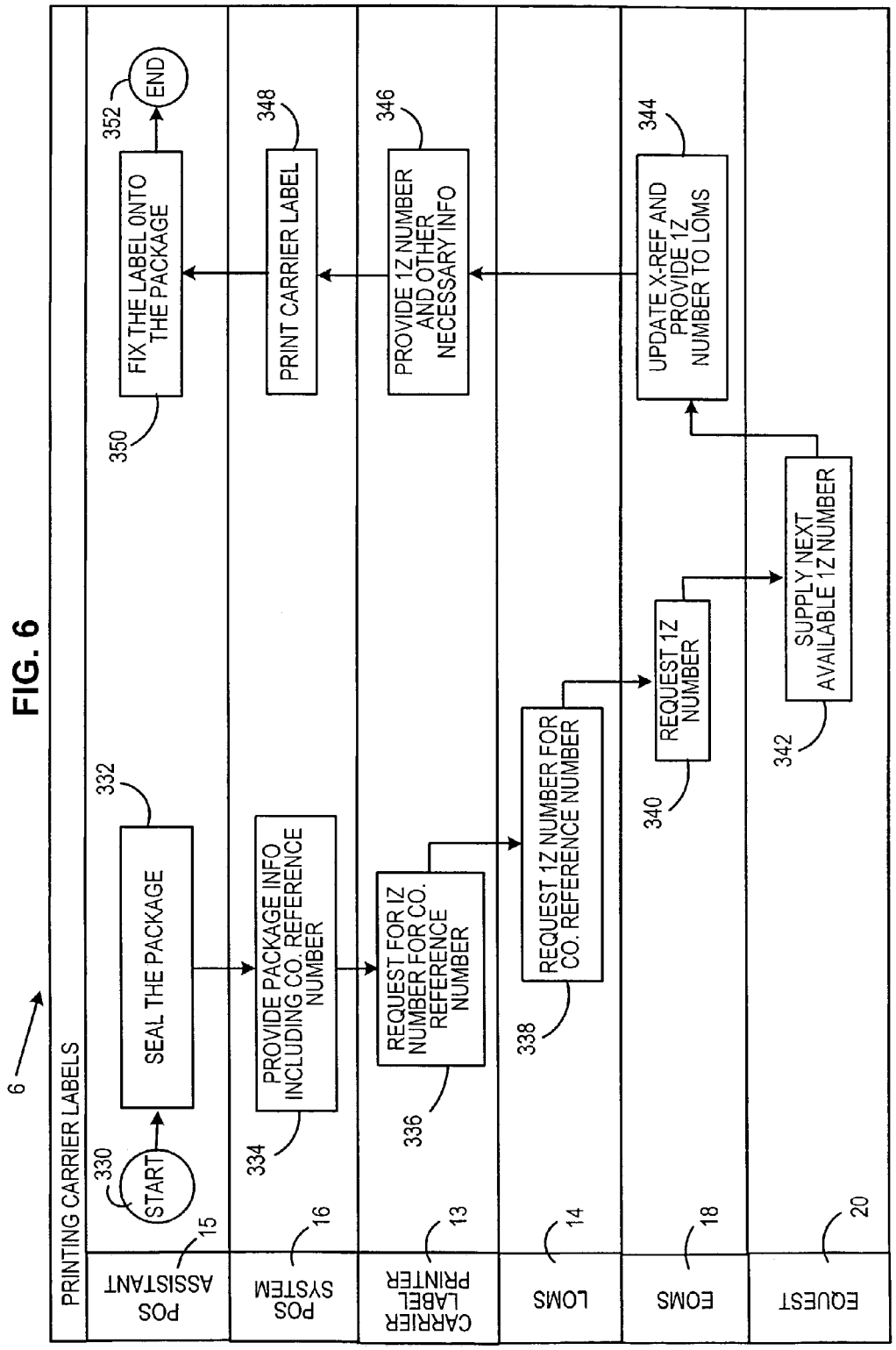
FIG. 6 is a flow chart showing a process for printing carrier labels according to another illustrative embodiment of the present application.

Referring to FIG. 6, a process for generating printer carrier labels is shown according to an illustrative embodiment of the application. The process diagram 6 is shown as a flow diagram with bands to indicate the system or actor of a step as above. In step 330, the process starts. In step 332, the POS Assistant 15 seals the package. In step 334, the POS system 16 provides package information including company reference information such as a reference number. In step 336, the carrier label printer system 13 makes a request for the package information at step 338 and the LOMS system 14 then requests a carrier identifier such as the identification number or "1 Z" number from the appropriate system. In step 340, the EOMS system 18 requests the carrier identifier.

In step 342, the eQuest system 20 supplies the next available identifier as appropriate. In an alternative, the eQuest system 20 may consider the type of the package and other factors in the selection. In step 344, the EOMS system 18 updates the cross reference to the package record and provides the identifier to the LOMS system 14.

In step 346, the carrier label printer system 13 obtains the information necessary to print a label and in step 348, the greeter 11 prints a carrier label. In step 350, the POS Assistant 15 affixes the label to the package and in step 352 the process ends. As can be appreciated, different systems or actors can perform certain steps of the process. For example, in this embodiment, the greeter 11 could perform step 350.

Figure 7B:
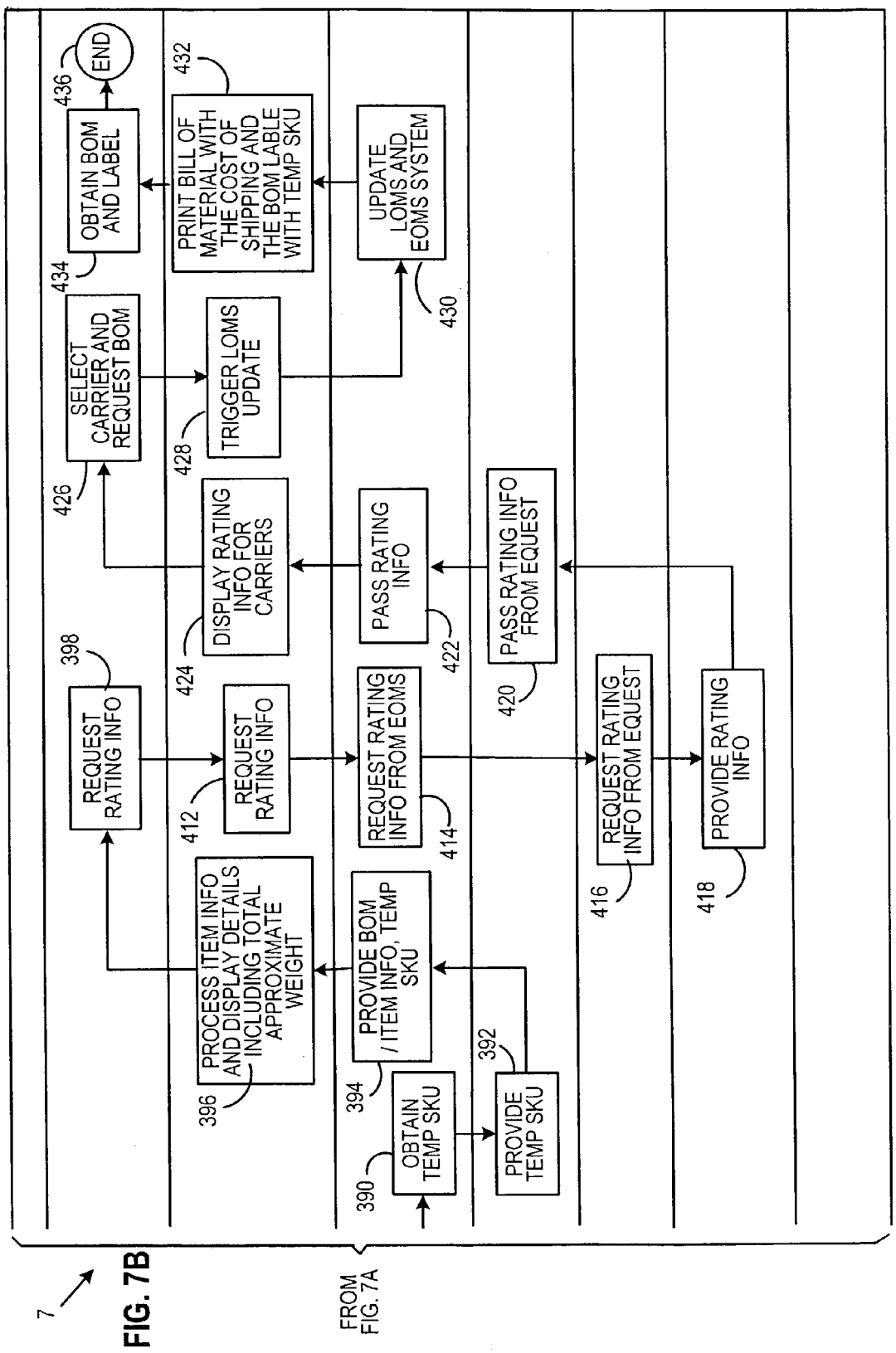

Referring to FIGS. 7A and 7B, a process for generating a Bill of Materials (BOM) at a kiosk 12 is shown according to an illustrative embodiment of the application. The process diagram 7 is shown as a flow diagram with horizontal bands according to the system or actor associated with a particular process entity as discussed above.

The process for generating a bill of materials begins in step 360. In step 362, the customer 10 performs a logon operation to the kiosk 12. In step 364, the kiosk 12 validates the login information and proceeds to step 366 for a validation test. If the logon information is not valid, the kiosk 12 proceeds to step 376 to process an error routine such as displaying an error message. If the logon information is valid, the kiosk 12 proceeds to step 368 to initiate a request for customer information. The process then proceeds to step 370 in which the CCSYS customer care system 22 provides customer details. In step 372, the kiosk 12 displays a welcome message and kiosk screen to the customer 10.

At step 374, the customer 10 enters data such as address information. In step 378, the customer 10 scans an item that could be a box, a pre-packaged item or other item. In step 380, the kiosk 12 initiates a request for information regarding the item to the LOMS system 14. In step 382, the LOMS system 14 checks whether a valid item identifier was provided. If not, in step 384, the kiosk 12 displays an error message to the customer 10 and in step 386 the customer 10 may decide to rescan or scan another item returning to step 378. If the LOMS system 14 finds a valid item, the system proceeds to step 388 to determine if the item is a box or pre-packaged item and then in step 390 the LOMS system 14 requests a temporary SKU identifier in step 392. In step 394, the POS application provides a temporary SKU identifier and the LOMS system provides box or item information and the temporary SKU to the kiosk 12. In step 396, the Kiosk 12 processes the item information and displays the details including total approximate weight information. In step 398, the customer 10 requests rating information. The kiosk 12 then processes the rating request in step 412 and in step 414, the LOMS system requests rating information from the EOMS system 18. In step 416, the EOMS system 18 requests rating information from the eQuest system 20 and in step 418, the eQuest system 20 provides rating information to the POS system 16.

At step 420, the POS system 16 passes the rating information from eQuest system 20 to the LOMS system 14, which in step 422 passes rating information to the kiosk. In step 424, the kiosk 12 displays rating information for one or more carriers. In step 426, the customer selects a particular carrier and requests a bill of materials. In step 428, the kiosk 12 triggers a LOMS system update. In step 430, the LOMS system 14 updates the LOMS system 14 and the EOMS system 18. In step 432, the Kiosk 12 prints the bill of materials with the cost of shipping and the box label having a temporary SKU that may be coded in a bar code. In step 434, the customer obtains the bill of materials and the label. In step 436, the process ends.

Figure 8B:
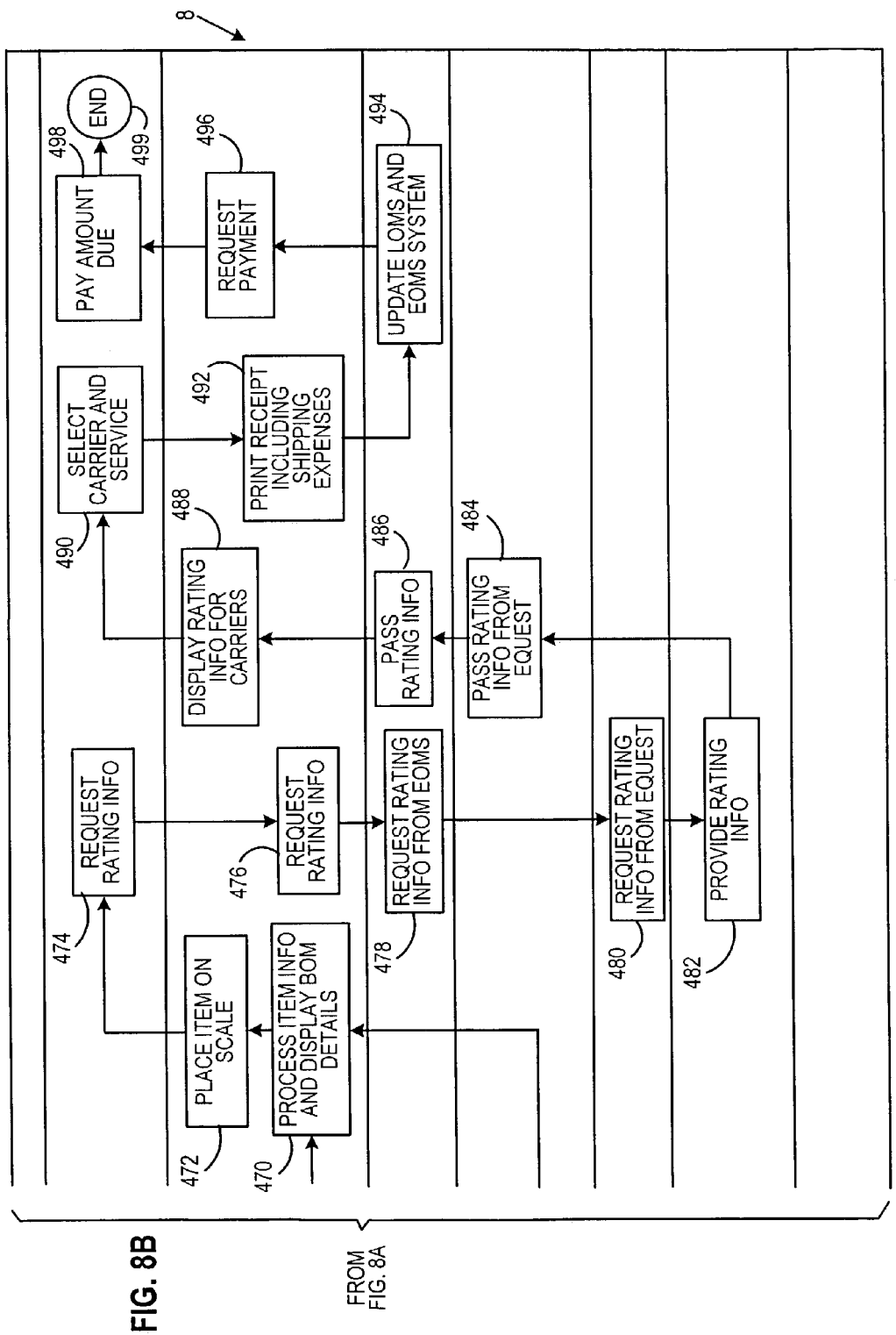

Referring to FIGS. 8A and 8B, a process for providing a Point of Sale POS shipping capability is described according to an illustrative embodiment of the application. The process diagram 8 shows a process where a customer care card is not available.

The process begins in step 440 and the customer 10 is asked for an identifier such as a customer care card in step 442 and does not have one. In step 444, the POS assistant/display system 15 determines if the customer 10 wants a card and if so, in step 446 the customer provides data such as customer care card information. Then in step 448, the information is displayed and written and in step 450, the new customer record is written to the Ccsys system 22. Thereafter and if the customer does not want a card, the process proceeds to step 452 and the POS Assistant/Display system 15 displays a welcome message to the customer 10 and requests destination information. For example, the customer 10i may be prompted to choose from a p re-stored selection of previously used addresses or from a list of intended recipients previously entered. The customer 10 may also be prompted to enter intended recipient information at the POS Assistant 15 and may utilize a keyboard, voice recognition or other data input methods in step 454. In step 456, the customer scans the item, box, package, pre-packed item or other item. The POS Assistant 15 then requests item information in step 458 and checks for a pre-packed item in step 460. If it is not a pre-packed item, the system proceeds to step 462 at the POS 16 to determine if it is a valid item. If it is not a valid item, the process proceeds to step 466 to display an error message to the POS assistant 15 to provide an error message to the customer in step 468 to allow the customer to scan another item in step 456. If it is a valid item, the process proceeds step 464, and if the process determines that the scanning is complete and proceeds to step 470. If scanning is not complete, the process proceeds to step 468 to provide an error message. Similarly, if a pre-packed item is found in step 460, the process proceeds to step 470 and the POS Assistant 15 processes the item information and gets the display of BOM details. In step 472, the POS Assistant places the item on a parameter capture device such as a scale. In step 474, the customer 10 requests rating information and in step 476, the POS Assistant 15 requests rating information for the carriers. In step 478, the LOMS 14 system requests rating information from EOMS. In step 480, the EOMS system 18 requests rating information from eQuest 20. In step 482, the eQuest system provides rating information to the POS 16. In step 484, the POS system 16, pass the rating information to the LOMS system 14 in step 486. In step 488, the POS Assistant 15 displays rating information for carriers. In step 490, the customer is able to select a carrier and a service. In step 492, the POS Assistant prints a receipt including shipping expenses. In step 494, the LOMS system 14 updates the LOMS data and EOMS system data. In step 496, the POS Assistant 15 requests payment and in step 498, the customer 10 provides payment. The process ends in step 499.

Referring to FIG. 9 a process for shipment tracking and shipment returns is shown according to an illustrative embodiment of the application. The process diagram 9 s shown as a flow diagram with bands to indicate the system or actor of a step as above. In step 512 first process branch starts at a OSA Customer Service station 214 and can be used by package shippers or intended recipients 514. In step 516, the shipper or receiver seeks shipment status/tracking information and provides an identifier such as the temporary SKU, retail store tracking number or shipper tracking number. In a second branch of the process, in step 518, a shipper 520 may utilize a kiosk 12 and may seek shipment status/tracking information and provides an identifier such as the temporary SKU, retail store tracking number or shipper tracking number in step 522. Thereafter, each branch proceeds to step 524 and utilizes the EOMS system 18 in associating the identifier provided with a shipper identifier as needed. In step 524, the two branches merge and the EOMS system 18 associates an identifier as required. In step 526, shipment and tracking information is received from UPS.COM shipping carrier 212A. In step 528, the EOMS system 18 parses the shipment information received as needed. In this step, templates for each carrier may be used to extract the relevant data. Additional information regarding the package may be obtained by the EOMS system 18 in this step.

In step 530, the Kiosk 12 presents the status to the shipper in the first branch and ends in step 536. In step 538 for the first branch, the process proceeds to step 532 and the CS station 214 assistant will take the appropriate action. For example, the customer can be provided tracking information if that was the request. If it is a refund request, the CSA station 214 assistant will process the refund decision. Then the process ends in step 534.

Figure 10:
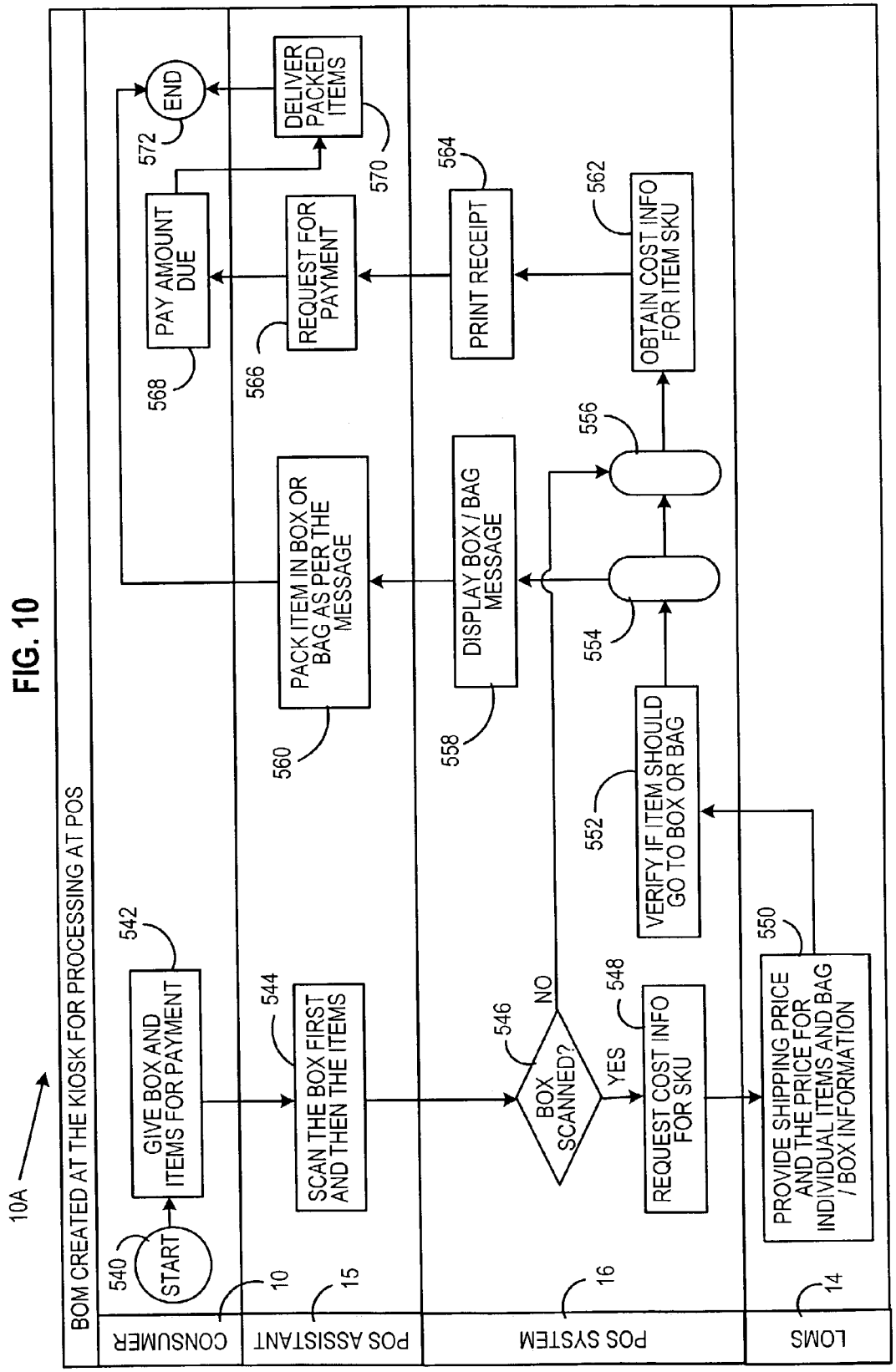
FIG. 10 is a flow chart showing a process for a shipping transaction according to another illustrative embodiment of the present application.

Referring to FIG. 10, a process for generating a Bill of Materials (BOM) at a kiosk 12 is shown according to an illustrative embodiment of the application. The process diagram 10A is shown as a flow diagram with horizontal bands according to the system or actor associated with a particular process entity as discussed above.

The process for generating a bill of materials begins in step 540. In step 542, the customer 10 presents the box and item for payment. In step 544, the POS Assistant 15 scans the box and the items. In step 546, the POS system 16 determines if a box was scanned. If so, in step 548, the process requests cost information for the SKU and in step 550, the LOMS system 14 provides the shipping price and the price for the individual items and bag/box information. Then in step 552, the P0S system, 16 determines If the item should be placed in a box or a bag and proceeds to step 554.

If the box is not scanned in step 546, the process proceeds to step 556 and then to step 562 to obtain cost information for the item SKU, prints a receipt in step 564 and in step 566, the POS assistant 15 requests payment. In step 568, the customer 10 pays the amount due and in step 570, the POS assistant 15 places the packed items in the delivery queue. The process then proceeds to step 572 and ends.

From step 554, the process either proceeds to step 556 as above or proceeds to step 558 to display a box/bag message. In step 560 the POS assistant 15 follows the message and places the item in a box or bag and the process proceeds to step 572 and ends.

Figure 11B:
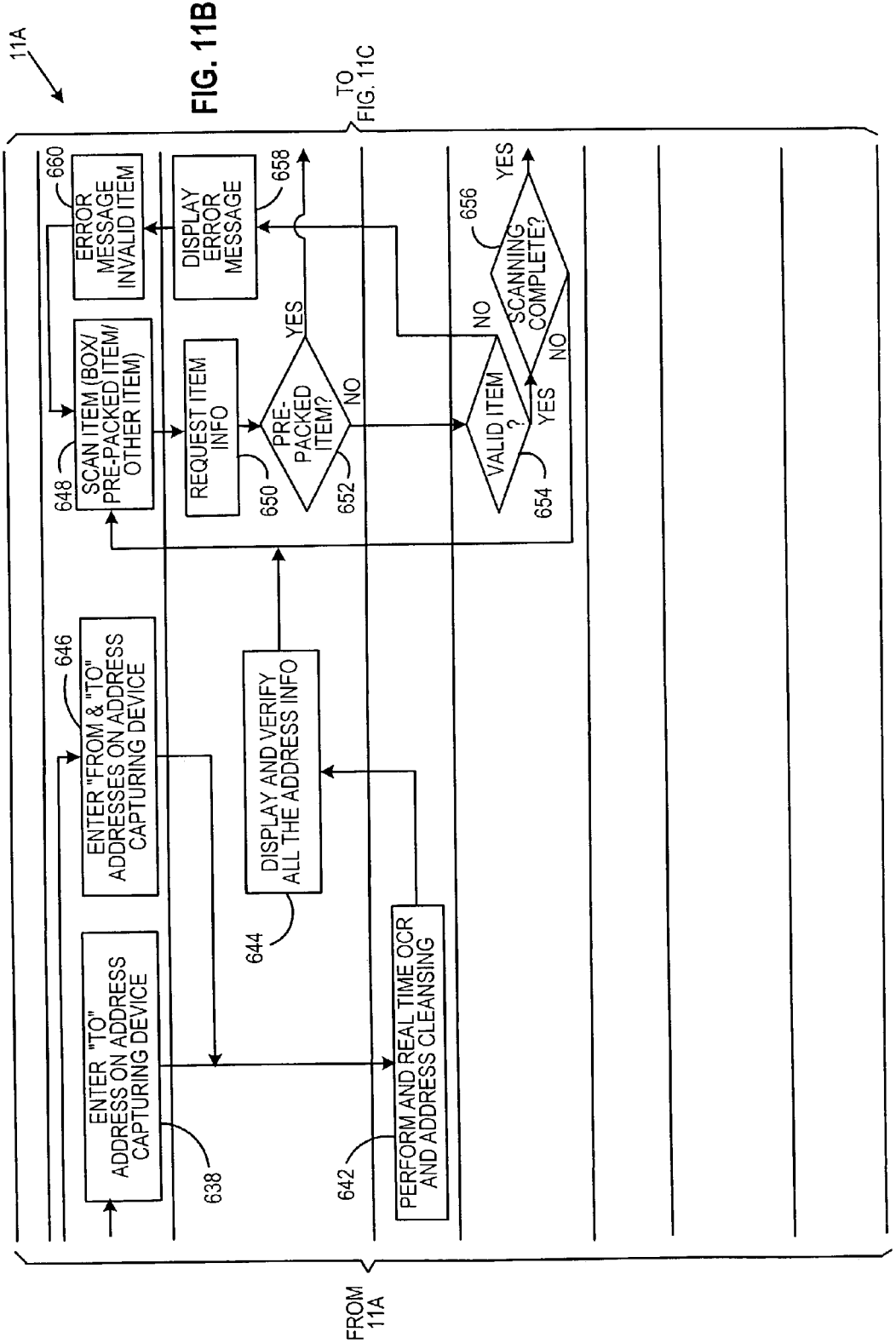
Figure 11C:
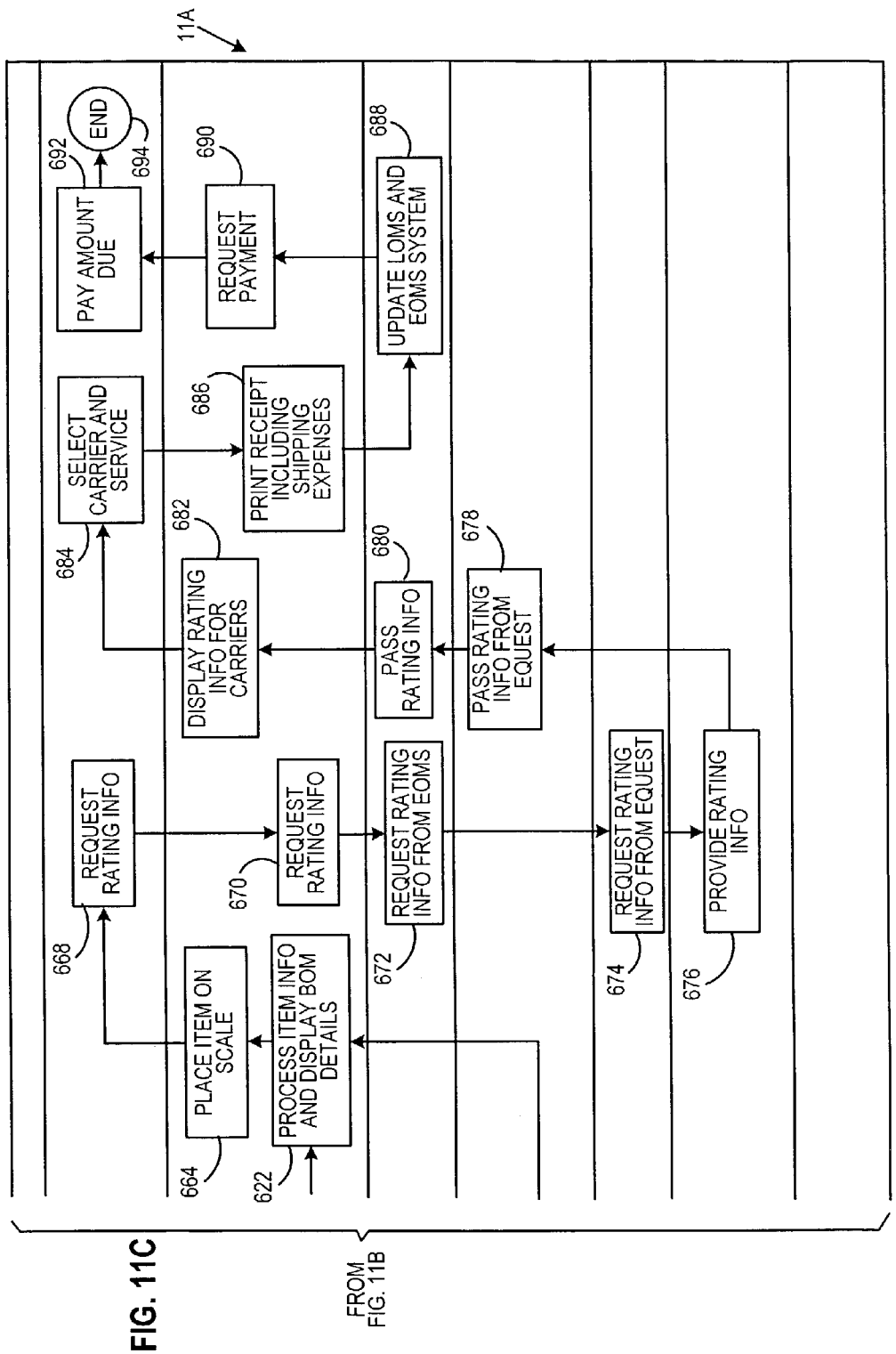

Referring to FIGS. 11A, 11B and 11C, a process for using OCR technology at a POS with shipping system functionality is shown according to an illustrative embodiment of the application. The process diagram 1A is shown as a flow diagram with horizontal bands according to the system or actor associated with a particular process entity.

The process begins in step 612 and the customer 10 is asked for an identifier such as a customer care card in step 614. In step 616, the POS assistant/display system 15 determines if the customer 10 wants a card and if so, in step 618 the customer provides data such as customer care card information. Then in step 620, the information is displayed and written and in step 622, the new customer record is written to the Ccsys system 22. Thereafter the process proceeds to step 640.

If the customer does not want a card in step 616, the POS Assistant/display system 15 displays a welcome message is displayed in step 630 and the customer 10 is prompted for identifying data such as driver license, another card with ID information such as a visiting card, credit card or telephone number.

In step 634, the customer uses an identifier or license to provide sender information such as a sender address. In one branch, the customer 10 in step 632 provides a telephone number or other contact information and the EOMS system 18 is used to perform and address lookup in step 624 and then the process branch also proceeds to step 640. From step 634, another branch proceeds to step 628 in which the LOMS system 14 is utilized to perform Optical Character Recognition (OCR) on the provided license or id card. In step 626, the process branch performs address cleansing and proceeds to step 640.

In step 640, the POS Assistant/Display 15 displays and verifies the from address and in 636 the customer 10 is asked to verify the customer data such as the from address. If it is not correct, the process proceeds to step 646 to capture from and destination information such as addresses and then proceeds to step 642. If the address information is correct, the process proceeds to step 638 for destination information such as an address. Then in step 642, the LOMS system performs real time address cleansing and OCR. In step 644, the POS Assistant/display system 15 displays and verifies all the address information.

In step 648, the customer 10 scans an item that could be a box, a pre-packaged item or other item. In step 650, the POS Assistant/display system 15 initiates a request for information regarding the item. In step 652, the system determines if the item is a pre-packed item and if not, proceeds to step 654 to determine if it is a valid item. If it is, the process proceeds to step 656 and if scanning is complete, the process proceeds to step 622. If scanning is not complete, the process proceeds to step 648. If the item is not valid, the process displays an error message in step 658 and provides that message to the customer in step 660 and the customer may enter a new item in step 648.

If the system determines there is a pre-packed item, the process proceeds to step 662, processes the item information and displays BOM detail information.

In step 664, the POS Assistant 15 places the item or box on a parameter-measuring device such as a weighing machine or scale. In step 668, the customer 10 requests rating information. The POS Assistant 15 then processes the rating request in step 670 and in step 672, the LOMS system requests rating information from the EOMS system 18. In step 674, the EOMS system 18 requests rating information from the eQuest system 20 and in step 676, the eQuest system 20 provides rating information to the POS system 16.

At step 678, the POS system 16 passes the rating information from eQuest system 20 to the LOMS system 14, which in step 680 passes rating information to the POS Assistant 15. In step 682, the POS Assistant/display system 15 displays rating information for one or more carriers. In step 684, the customer selects a particular carrier and requests a bill of materials. In step 686, the system prints a receipt including shipping charge information and in step 688 LOMS system 14 updates the LOMS system 14 and the EOMS system 18. In step 690, the POS Assistant 15 request payment and in step 692, the customer 10 pays the amount due. In step 694 the process ends.

The present application describes illustrative embodiments including those for shipping systems. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for processing a payment related to a shipment comprising:
   receiving information relating to at least one item to be shipped in the shipment;
   receiving information relating to a destination for the at least one item;
   determining shipping information including a shipping cost for the shipment;
   storing the shipping information on a server;
   providing an identifier for retrieving the shipping information from the server;
   printing a code representing the identifier on an identifier media before processing payment for the at least one item;
   receiving the identifier media at a payment location and obtaining the identifier from the identifier media at the payment location; and
   processing the payment for the at least one item and the shipping cost in a single transaction at the payment location using the identifier to obtain the shipping information from the server.

2. The method of claim 1, further comprising:
   receiving the at least one item to be shipped at the payment location.

3. The method of claim 1, wherein:
   receiving information relating to destination is obtained from a shipper using a keyboard.

4. The method of claim 1, further comprising:
   receiving the at least one item to be shipped at a kiosk;
   using the information relating to the at least one item to query a do not ship list to determine whether the item type may be shipped.

5. The method of claim 4, wherein: the code comprises a temporary SKU label associated with the single transaction.

6. The method of claim 4, further comprising:
   receiving shipper information related to the shipment; and
   receiving recipient information related to the shipment.

7. The method of claim 6, wherein:
   the shipper information is obtained from a customer information database; and
   communicating a recipient selection list to a kiosk user for obtaining the recipient information as a selection from the recipient selection list.

8. The method of claim 2, further comprising:
obtaining shipping parameters at the kiosk.

9. The method of claim 8, wherein:
the shipping parameters include weight of the at least one item to be shipped and are obtained using a scale; and
further comprising,
using the information relating to the at least one item to query a item weight database to determine an expected weight for the at least one item; and
determining whether the weight of the at least one item obtained using a scale is substantially equivalent to the expected weight.

10. The method of claim 8, wherein:
the shipping parameters include dimensions of the at least one item to be shipped and are obtained using a dimensional weighing system.

* * * * *